United States Patent [19]
Kammeter

[11] Patent Number: 5,343,080
[45] Date of Patent: * Aug. 30, 1994

[54] HARMONIC CANCELLATION SYSTEM

[75] Inventor: John B. Kammeter, Richmond, Va.

[73] Assignee: Power Distribution, Inc., Sandston, Va.

[*] Notice: The portion of the term of this patent subsequent to Apr. 27, 2010 has been disclaimed.

[21] Appl. No.: 196,813

[22] Filed: Feb. 14, 1994

Related U.S. Application Data

[63] Continuation of Ser. No. 992,061, Dec. 16, 1992, abandoned, which is a continuation-in-part of Ser. No. 792,893, Nov. 15, 1991, Pat. No. 5,206,539.

[51] Int. Cl.$^5$ .................................................. H02J 3/01
[52] U.S. Cl. ........................................ 307/105; 336/5
[58] Field of Search ............... 307/17, 85, 105; 336/5, 336/10, 12; 323/361, 215; 333/177, 178, 179

[56] References Cited

U.S. PATENT DOCUMENTS

| | | |
|---|---|---|
| 1,719,892 | 7/1929 | Kubler . |
| 2,025,584 | 12/1935 | Fitz Gerald . |
| 2,307,527 | 1/1943 | Maslin et al. . |
| 2,470,598 | 5/1949 | Biebesheimer ................ 336/12 |
| 2,482,489 | 5/1949 | Kaiser ............................. 336/5 |
| 2,790,131 | 4/1957 | Nyyssonen . |
| 3,295,050 | 12/1966 | Rowan, Jr. et al. . |
| 3,379,961 | 4/1968 | Kobayashi et al. . |
| 3,500,166 | 3/1970 | Mesenhimer et al. . |
| 3,555,291 | 1/1971 | Dewey ........................... 307/105 |
| 3,601,690 | 8/1971 | Judson et al. . |
| 3,671,901 | 6/1972 | Lys ................................ 336/5 |
| 3,711,760 | 1/1973 | Kaiser . |
| 3,742,251 | 6/1973 | Thompson et al. ............ 307/242 |
| 3,792,286 | 2/1974 | Meier . |
| 3,796,890 | 3/1974 | Thompson et al. ............ 307/24 |
| 3,859,542 | 1/1975 | Kennedy . |
| 3,913,005 | 10/1975 | Cook . |
| 3,916,246 | 10/1975 | Preist . |
| 3,970,914 | 7/1976 | Salzmann et al. . |
| 3,991,359 | 11/1976 | Thompson et al. . |
| 4,074,343 | 2/1978 | Chaussy et al. ............... 363/14 |
| 4,106,089 | 8/1978 | Fettinger . |
| 4,112,403 | 9/1978 | Friedlander . |
| 4,209,757 | 6/1980 | Becker ........................... 333/17 R |
| 4,305,033 | 12/1981 | Powell ........................... 323/306 |
| 4,384,214 | 5/1983 | Crick et al. .................... 307/66 |
| 4,513,240 | 4/1985 | Putman ......................... 323/210 |
| 4,513,243 | 4/1985 | Novak .......................... 323/181 |
| 4,517,471 | 5/1985 | Sachs ............................ 307/67 |
| 4,531,085 | 7/1985 | Mesenhimer ................. 323/214 |
| 4,544,877 | 10/1985 | Powell .......................... 323/308 |
| 4,567,423 | 1/1986 | Dobsa et al. . |

(List continued on next page.)

FOREIGN PATENT DOCUMENTS

| | | |
|---|---|---|
| 54-125434 | 9/1979 | Japan . |
| 771820 | 10/1980 | U.S.S.R. . |
| 920990 | 4/1982 | U.S.S.R. . |
| 112829 | 1/1918 | United Kingdom . |
| 495370 | 8/1937 | United Kingdom . |
| 474209 | 10/1937 | United Kingdom . |
| 725290 | 3/1955 | United Kingdom . |
| 964118 | 7/1964 | United Kingdom . |

OTHER PUBLICATIONS

R. H. Lee, Power Quality, "Eliminating Harmonic Currents Using Transformers," Sep./Oct., 1991, pp. 33–37, Power Quality.

(List continued on next page.)

Primary Examiner—Jeffrey A. Gaffin
Attorney, Agent, or Firm—Bacon & Thomas

[57] ABSTRACT

A harmonic current filtering transformer includes a three-phase input winding and at least two wye-connected three-phase output windings. The output windings are phase shifted relative to each other by an amount which causes harmonic currents generated by a non-linear load to magnetically cancel in the transformer core.

27 Claims, 23 Drawing Sheets

U.S. PATENT DOCUMENTS

| | | | |
|---|---|---|---|
| 4,651,265 | 3/1987 | Stacey et al. | 363/35 |
| 4,678,297 | 7/1987 | Stein et al. | 307/104 |
| 4,684,875 | 8/1987 | Powell | 323/308 |
| 4,689,735 | 8/1987 | Young . | |
| 4,736,090 | 4/1988 | De Broeck et al. | 219/497 |
| 4,779,181 | 10/1988 | Traver et al. | 363/154 |
| 4,812,669 | 3/1989 | Takeda et al. | 307/105 |
| 4,858,100 | 8/1989 | Tatara | 363/161 |
| 4,862,059 | 8/1989 | Tominaga et al. . | |
| 4,890,213 | 12/1989 | Seki | 363/49 |
| 4,893,069 | 1/1990 | Harada et al. . | |
| 4,922,124 | 5/1990 | Seki et al. | 307/87 |
| 4,939,486 | 7/1990 | Bergdahl et al. | 333/175 |
| 4,953,071 | 8/1990 | Lipman | 363/72 |
| 4,964,012 | 10/1990 | Kitagawa | 361/113 |
| 5,003,277 | 3/1991 | Sokai et al. . | |
| 5,063,487 | 11/1991 | Johnson et al. | 363/3 |
| 5,070,441 | 12/1991 | Ashley . | |
| 5,107,410 | 4/1992 | Marsh et al. . | |
| 5,166,597 | 11/1992 | Larsen et al. . | |
| 5,172,009 | 12/1992 | Mohan | 307/46 |
| 5,206,539 | 4/1993 | Kammeter | 307/105 |
| 5,224,029 | 6/1993 | Newman, Jr. | 363/48 |
| 5,235,503 | 8/1993 | Stemmler et al. | 363/37 |

OTHER PUBLICATIONS

R. H. Lee, *Power Quality*, "Eliminating Harmonic Currents Using Transformers," Oct. 1989 Proceedings, Power Quality.

IBM Specifications, "Input Power Specifications," IBM 1990, 1991.

R. H. Lee, "Line Current Harmonics Effects on Transformers," Jul. 18, 1991, Teledyne Crittenden.

A. F. Puchstein et al., *Alternating Current Machines*, 1948, New York, Wiley & Sons.

P. Wood, *Switching Power Converters*, 1981, New York, Van Nostrand Reinhold Co.

R. G. Hoft, *Principles of Inverter Circuits*, 1981, New York, Wiley & Son.

Teledyne Specifications, "Shielded Isolation Harmonic Canceller".

K. Marsh, "Poly-Phase Power Sources Switching Power Supply Office Equipment," Jul. 17, 1991, Group Dekko.

Power Distribution specifications "Powerpak AK 9000/4 Harmonic Cancellation," Sep. 1, 1991.

B. D. Bedford and R. G. Hoft, *Principles of Inverter Circuits*, 1964, New York, Wiley & Sons.

I. K. Dortort "Phase Shifting of Harmonics in AC Circuits of Rectifiers," IEEE, Nov./Dec. 1968.

H. Winograd and J. B. Rice, "Conversion of Electric Power," *Standard Handbook for Electrical Engineers*, McGraw-Hill, New York, pp. 12-2 to 12-39.

"Compensation of Static Power Converters," *IEEE Guide for Harmonic Control and Reactive*, pp. 35–44.

Ordean Kiltie, *Design Shortcuts & Procedures for Electronics Power Transformers & Inductors*, pp. 55–64.

J. C. Read, *The Calculation of Rectifier and Inverter Performance Characteristics*, IEE Journal, vol. 92, Pt. II (1945).

W. Tucker, *Laboratory Investigations of a Nine-Phase Zigzag-Connected Power Transformer for Electrical System Harmonic Current Reduction*, Feb. 1986.

L. Walker, *10 MTW GTO Converter for Battery Peaking Service*, 1988 IEEE.

J. W. A. Wilson, *Double Bridge Inverters with Magnetic Coupling—Part 1: Voltage Waveforms*, IAS '76 Annual.

J. W. A. Wilson, *Double Bridge Inverters with Magnetic Coupling—Part 2: Current Waveforms*, IAS '76.

"USA Standard Practices and Requirements for Semiconductor Power Rectifiers," IEEE 1968.

N. Chackan, "Nine-Phase Transformer Harmonic Voltage Contribution on Various Electrical System Buses," May 18, 1985, PA.

M. Williams, "System Level Reduction of Line Current Harmonics Caused by Capacitor Input Rectifiers in 3-Phase Systems," (Preliminary Draft) Dec. 15, 1981.

Navy Specification 17221C, 1988.

Navy Specification 17221B, 1986.

Navy Specification 15108D, 1988.

Letter to Mr. C. Y. Lu describing "Teledyne Crittenden ZZ-N1 Zig-Zag transformer" with attachments.

*Standard Handbook for Electrical Engineers*, 11th Ed., Transformers pp. 10-11, FIGS. 10-15 and 10-16.

*IEEE Standard Dictionary of Electrical and Electronics Terms*, 3rd Ed., 1984, p. 1508.

Ling, Engineering Drawing PT-1429 for 23 KW Power Trans. for 3 MF AC Supply DMAC-3B.

Othmar Marti and Harold Winowgrad, "Mercury Arc Power Rectifiers," 1930, p. 153; McGraw-Hill.

(List continued on next page.)

OTHER PUBLICATIONS

Westinghouse Electric Corp., Proposed Revision to Specification MIL-T-15108C, Preliminary Report, Oct. 31, 1986, PA.

Alex Levran and Robert H. Lee, handout from course or lecture at UCLA "Power Electronic Circuit: Theory and Practice," Jan. 29–Feb. 2, year unknown.

Dept. of Electrical Engineering at MIT, "Magnetic Circuits and Transformers," pp. 564–586 and 656–672, date unknown.

D. G. Fink and H. W. Beaty, *Standard Handbook for Electrical Engineers*, pp. 10–11, McGraw-Hill Book Company, 11th Ed.

The Institute of Electrical and Electronics Engineers, Inc., *The New IEEE Standard Dictionary of Electrical and Electronics Terms*, 1993, New York.

Blume et al., *Transformer Engineering*, 1938, pp. 171, 213–217, New York, John Wiley & Son Inc.

Ordean Kiltie, *Design Shortcuts & Procedures for Electronics Power Transformers & Inductors*, 1975, Ohio, Harris Publishing Company.

Johannes Schaefer, *Rectifier Circuits: Theory and Design*, 1965, pp. 58–67, New York; John Wiley and Sons, Inc.

Intertec Communications, Inc., *Power Quality '89 USA Official Proceedings of the First International Power Quality Conference*, 1989, pp. 324–337, California.

| VECTOR | RELATIVE MAGNITUDE | PHASE ANGLE (degrees) |
|---|---|---|
| X4 | 1 | -15 |
| A | 0.8165 | 0 |
| X1 | 1 | +15 |
| X5 | 1 | +105 |
| B | 0.8165 | +120 |
| X2 | 1 | +135 |
| X6 | 1 | +225 |
| C | 0.8165 | +240 |
| X3 | 1 | +255 |
| A1 | 0.2989 | -60 |
| A2 | 0.2989 | +60 |
| B1 | 0.2989 | +60 |
| B2 | 0.2989 | +180 |
| C1 | 0.2989 | +180 |
| C2 | 0.2989 | -60 |

FIG. 7

| VECTOR | RELATIVE MAGNITUDE | PHASE ANGLE (degrees) |
|---|---|---|
| X4 | 1 | -15 |
| A | 0.8165 | 0 |
| X1 | 1 | +15 |
| X5 | 1 | +105 |
| B | 0.8165 | +120 |
| X2 | 1 | +135 |
| X6 | 1 | +225 |
| C | 0.8165 | +240 |
| X3 | 1 | +255 |
| A1 | 0.2989 | -60 |
| A2 | 0.2989 | +60 |
| B1 | 0.2989 | +60 |
| B2 | 0.2989 | +180 |
| C1 | 0.2989 | +180 |
| C2 | 0.2989 | -60 |
| X7 | 1 | -7.5 |
| X10 | 1 | +7.5 |
| X8 | 1 | +112.5 |
| X11 | 1 | +127.5 |
| X9 | 1 | +232.5 |
| X12 | 1 | +247.5 |
| $a_1$ | 0.9161 | +0 |
| $b_1$ | 0.9161 | +120 |
| $c_1$ | 0.9161 | +240 |
| A3 | 0.1507 | -60 |
| A4 | 0.1507 | +60 |
| B3 | 0.1507 | +60 |
| B4 | 0.1507 | +180 |
| C3 | 0.1507 | +180 |
| C4 | 0.1507 | -60 |

OUTPUT #1 = −15 ø SHIFT;
OUTPUT #2 = −45 ø SHIFT;

| HARMONIC ORDER | PHASE SEQUENCE | OUTPUT #1 | | OUTPUT #2 | | VECTORIAL SUM REFLECTED TO INPUT | NORMALIZED VECTORIAL SUM REFLECTED TO INPUT | HARMONIC ORDER |
|---|---|---|---|---|---|---|---|---|
| | | HARM PHASE SHIFT | REFLECTED INPUT CURRENT SHIFT | HARM PHASE SHIFT | REFLECTED INPUT CURRENT SHIFT | | | |
| 1  | + | −15   | −15  | −45   | −45   | 2.000 | 1 | 1  |
| 3  | 0 | **    | **   | **    | **    | 0.000 | 0 | 3  |
| 5  | − | −75   | −90  | −225  | −270  | 0.000 | 0 | 5  |
| 7  | + | 105   | −90  | 315   | −270  | 0.000 | 0 | 7  |
| 9  | 0 | **    | **   | **    | **    | 0.000 | 0 | 9  |
| 11 | − | −165  | −180 | −495  | −540  | 2.000 | 1 | 11 |
| 13 | + | 195   | −180 | 585   | −540  | 2.000 | 1 | 13 |
| 15 | 0 | **    | **   | **    | **    | 0.000 | 0 | 15 |
| 17 | − | −255  | −270 | −765  | −810  | 0.000 | 0 | 17 |
| 19 | + | 285   | −270 | 855   | −810  | 0.000 | 0 | 19 |
| 21 | 0 | **    | **   | **    | **    | 0.000 | 0 | 21 |
| 23 | − | −345  | −360 | −1035 | −1080 | 2.000 | 1 | 23 |
| 25 | + | 375   | −360 | 1125  | −1080 | 2.000 | 1 | 25 |
| 27 | 0 | **    | **   | **    | **    | 0.000 | 0 | 27 |
| 29 | − | −435  | −450 | −1305 | −1350 | 0.000 | 0 | 29 |
| 31 | + | 465   | −450 | 1395  | −1350 | 0.000 | 0 | 31 |
| 33 | 0 | **    | **   | **    | **    | 0.000 | 0 | 33 |
| 35 | − | −525  | −540 | −1575 | −1620 | 2.000 | 1 | 35 |
| 37 | + | 555   | −540 | 1665  | −1620 | 2.000 | 1 | 37 |
| 39 | 0 | **    | **   | **    | **    | 0.000 | 0 | 39 |
| 41 | − | −615  | −630 | −1845 | −1890 | 0.000 | 0 | 41 |
| 43 | + | 645   | −630 | 1935  | −1890 | 0.000 | 0 | 43 |
| 45 | 0 | **    | **   | **    | **    | 0.000 | 0 | 45 |
| 47 | − | −705  | −720 | −2115 | −2160 | 2.000 | 1 | 47 |
| 49 | + | 735   | −720 | 2205  | −2160 | 2.000 | 1 | 49 |
| 51 | 0 | **    | **   | **    | **    | 0.000 | 0 | 51 |
| 53 | − | −795  | −810 | −2385 | −2430 | 0.000 | 0 | 53 |
| 55 | + | 825   | −810 | 2475  | −2430 | 0.000 | 0 | 55 |

FIG. 8a

OUTPUT #1 =    0 ø SHIFT;
OUTPUT #2 =   30 ø SHIFT;

| HARD MEORNIC | PHASE Q SE | OUTPUT # 1 | | OUTPUT # 2 | | VECTORIAL SUM REFLECTED TO INPUT | NORMALIZED VECTORIAL SUM REFLECTED TO INPUT | HARD MEORNIC |
|---|---|---|---|---|---|---|---|---|
| | | REFLECTED HARM INPUT PHASE CURRENT SHIFT SHIFT | | REFLECTED HARM INPUT PHASE CURRENT SHIFT SHIFT | | | | |
| 1 | + | 0 | 0 | 30 | 30 | 2.000 | 1 | 1 |
| 3 | 0 | ** | ** | ** | ** | 0.000 | 0 | 3 |
| 5 | − | 0 | 0 | 150 | 180 | 0.000 | 0 | 5 |
| 7 | + | 0 | 0 | 210 | 180 | 0.000 | 0 | 7 |
| 9 | 0 | ** | ** | ** | ** | 0.000 | 0 | 9 |
| 11 | − | 0 | 0 | −330 | 360 | 2.000 | 1 | 11 |
| 13 | + | 0 | 0 | 390 | 360 | 2.000 | 1 | 13 |
| 15 | 0 | ** | ** | ** | ** | 0.000 | 0 | 15 |
| 17 | − | 0 | 0 | −510 | 540 | 0.000 | 0 | 17 |
| 19 | + | 0 | 0 | 570 | 540 | 0.000 | 0 | 19 |
| 21 | 0 | ** | ** | ** | ** | 0.000 | 0 | 21 |
| 23 | − | 0 | 0 | −690 | 720 | 2.000 | 1 | 23 |
| 25 | + | 0 | 0 | 750 | 720 | 2.000 | 1 | 25 |
| 27 | 0 | ** | ** | ** | ** | 0.000 | 0 | 27 |
| 29 | − | 0 | 0 | −870 | 900 | 0.000 | 0 | 29 |
| 31 | + | 0 | 0 | 930 | 900 | 0.000 | 0 | 31 |
| 33 | 0 | ** | ** | ** | ** | 0.000 | 0 | 33 |
| 35 | − | 0 | 0 | −1050 | 1080 | 2.000 | 1 | 35 |
| 37 | + | 0 | 0 | 1110 | 1080 | 2.000 | 1 | 37 |
| 39 | 0 | ** | ** | ** | ** | 0.000 | 0 | 39 |
| 41 | − | 0 | 0 | −1230 | 1260 | 0.000 | 0 | 41 |
| 43 | + | 0 | 0 | 1290 | 1260 | 0.000 | 0 | 43 |
| 45 | 0 | ** | ** | ** | ** | 0.000 | 0 | 45 |
| 47 | − | 0 | 0 | −1410 | 1440 | 2.000 | 1 | 47 |
| 49 | + | 0 | 0 | 1470 | 1440 | 2.000 | 1 | 49 |
| 51 | 0 | ** | ** | ** | ** | 0.000 | 0 | 51 |
| 53 | − | 0 | 0 | −1590 | 1620 | 0.000 | 0 | 53 |
| 55 | + | 0 | 0 | 1650 | 1620 | 0.000 | 0 | 55 |

FIG. 8b

| OUTPUT 1 = | 15 ⌀ SHIFT; | OUTPUT 4 = | 60 ⌀ SHIFT |
|---|---|---|---|
| OUTPUT 2 = | 30 ⌀ SHIFT; | | |
| OUTPUT 3 = | 45 ⌀ SHIFT; | | |

| HARM ORDER NO. | PHASE MEASURE | OUTPUT #1 HARM INPUT PHASE SHIFT | OUTPUT #1 REFLECTED CURRENT SHIFT | OUTPUT #2 HARM INPUT PHASE SHIFT | OUTPUT #2 REFLECTED CURRENT SHIFT | OUTPUT #3 HARM INPUT PHASE SHIFT | OUTPUT #3 REFLECTED CURRENT SHIFT | OUTPUT #4 HARM INPUT PHASE SHIFT | OUTPUT #4 REFLECTED CURRENT SHIFT | VECTORIAL SUM REFLECTED INPUT | NORMALIZED VECTORIAL SUM REFLECTED INPUT | HARM ORDER NO. |
|---|---|---|---|---|---|---|---|---|---|---|---|---|
| 1 | + | −15 | 0 | −30 | 0 | −45 | 0 | −60 | 0 | 4.000 | 1 | 1 |
| 3 | 0 | ** | ** | ** | ** | ** | ** | ** | ** | 0.000 | 0 | 3 |
| 5 | − | 75 | 90 | 150 | 180 | 225 | 270 | 300 | 360 | 0.000 | 0 | 5 |
| 7 | 0 | −105 | 90 | 210 | 180 | −315 | 270 | −420 | 360 | 0.000 | 0 | 7 |
| 9 | 0 | ** | ** | ** | ** | ** | ** | ** | ** | 0.000 | 0 | 9 |
| 11 | + | 165 | 180 | −330 | 360 | 495 | 540 | 660 | 720 | 0.000 | 0 | 11 |
| 13 | − | −195 | 180 | 390 | 360 | −585 | 540 | −780 | 720 | 0.000 | 0 | 13 |
| 15 | 0 | ** | ** | ** | ** | ** | ** | ** | ** | 0.000 | 0 | 15 |
| 17 | + | 255 | 270 | −510 | 540 | 765 | 810 | 1020 | 1080 | 0.000 | 0 | 17 |
| 19 | − | −285 | 270 | 570 | 540 | −855 | 810 | −1140 | 1080 | 0.000 | 0 | 19 |
| 21 | 0 | ** | ** | ** | ** | ** | ** | ** | ** | 0.000 | 0 | 21 |
| 23 | + | 345 | 380 | −690 | 720 | 1035 | 1080 | 1380 | 1440 | 4.000 | 1 | 23 |
| 25 | − | −375 | 360 | 750 | 720 | −1125 | 1080 | −1500 | 1440 | 4.000 | 1 | 25 |
| 27 | 0 | ** | ** | ** | ** | ** | ** | ** | ** | 0.000 | 0 | 27 |
| 29 | + | 435 | 450 | −870 | 900 | 1305 | 1350 | 1740 | 1800 | 0.000 | 0 | 29 |
| 31 | − | −465 | 450 | 930 | 900 | −1395 | 1350 | −1860 | 1800 | 0.000 | 0 | 31 |
| 33 | 0 | ** | ** | ** | ** | ** | ** | ** | ** | 0.000 | 0 | 33 |
| 35 | + | 525 | 540 | −1050 | 1080 | 1575 | 1620 | 2100 | 2160 | 0.000 | 0 | 35 |
| 37 | − | −555 | 540 | 1110 | 1080 | −1665 | 1620 | −2220 | 2160 | 0.000 | 0 | 37 |
| 39 | 0 | ** | ** | ** | ** | ** | ** | ** | ** | 0.000 | 0 | 39 |
| 41 | + | 615 | 630 | −1230 | 1260 | 1845 | 1890 | 2460 | 2520 | 0.000 | 0 | 41 |
| 43 | − | −645 | 630 | 1290 | 1260 | −1935 | 1890 | −2580 | 2520 | 0.000 | 0 | 43 |
| 45 | 0 | ** | ** | ** | ** | ** | ** | ** | ** | 0.000 | 0 | 45 |
| 47 | + | 705 | 720 | −1410 | 1440 | 2115 | 2160 | 2820 | 2880 | 4.000 | 1 | 47 |
| 49 | − | −735 | 720 | 1470 | 1440 | −2205 | 2160 | −2940 | 2880 | 4.000 | 1 | 49 |
| 51 | 0 | ** | ** | ** | ** | ** | ** | ** | ** | 0.000 | 0 | 51 |
| 53 | − | 795 | 810 | −1590 | 1620 | 2385 | 2430 | 3180 | 3240 | 0.000 | 0 | 53 |
| 55 | + | −825 | 810 | 1650 | 1620 | −2475 | 2430 | −3300 | 3240 | 0.000 | 0 | 55 |

FIG. 10

OUTPUT#1 =   20 ø SHIFT;
OUTPUT#2 =    0 ø SHIFT;
OUTPUT#3 =  -20 ø SHIFT;

| HARMONIC | PSHASE | OUTPUT #1 | | OUTPUT #2 | | OUTPUT #3 | | VECTORIAL SUM REFLECTED TO INPUT | NORMALIZED VECTORIAL SUM REFLECTED TO INPUT | HARMONIC |
|---|---|---|---|---|---|---|---|---|---|---|
| | | REFLECTED HARM PHASE SHIFT | INPUT CURRENT SHIFT | REFLECTED HARM PHASE SHIFT | INPUT CURRENT SHIFT | REFLECTED HARM PHASE SHIFT | INPUT CURRENT SHIFT | | | |
| 1  | + | -20   | 20   | 0  | 0  | -20   | -20   | 3.000 | 1 | 1  |
| 3  | 0 | **    | **   | ** | ** | **    | **    | 0.000 | 0 | 3  |
| 5  | - | 100   | 120  | 0  | 0  | -100  | -120  | 0.000 | 0 | 5  |
| 7  | + | -140  | -120 | 0  | 0  | 140   | 120   | 0.000 | 0 | 7  |
| 9  | 0 | **    | **   | ** | ** | **    | **    | 0.000 | 0 | 9  |
| 11 | - | 220   | 240  | 0  | 0  | -220  | -240  | 0.000 | 0 | 11 |
| 13 | + | -260  | -240 | 0  | 0  | 260   | 240   | 0.000 | 0 | 13 |
| 15 | 0 | **    | **   | ** | ** | **    | **    | 0.000 | 0 | 15 |
| 17 | - | 340   | 360  | 0  | 0  | -340  | -360  | 3.000 | 1 | 17 |
| 19 | + | -380  | -360 | 0  | 0  | 380   | 360   | 3.000 | 1 | 19 |
| 21 | 0 | **    | **   | ** | ** | **    | **    | 0.000 | 0 | 21 |
| 23 | - | 460   | 480  | 0  | 0  | -460  | -480  | 0.000 | 0 | 23 |
| 25 | + | -500  | -480 | 0  | 0  | 500   | 480   | 0.000 | 0 | 25 |
| 27 | 0 | **    | **   | ** | ** | **    | **    | 0.000 | 0 | 27 |
| 29 | - | 580   | 600  | 0  | 0  | -580  | -600  | 0.000 | 0 | 29 |
| 31 | + | -620  | -600 | 0  | 0  | 620   | 600   | 0.000 | 0 | 31 |
| 33 | 0 | **    | **   | ** | ** | **    | **    | 0.000 | 0 | 33 |
| 35 | - | 700   | 720  | 0  | 0  | -700  | -720  | 3.000 | 1 | 35 |
| 37 | + | -740  | -720 | 0  | 0  | 740   | 720   | 3.000 | 1 | 37 |
| 39 | 0 | **    | **   | ** | ** | **    | **    | 0.000 | 0 | 39 |
| 41 | - | 820   | 840  | 0  | 0  | -820  | -840  | 0.000 | 0 | 41 |
| 43 | + | -860  | -840 | 0  | 0  | 860   | 840   | 0.000 | 0 | 43 |
| 45 | 0 | **    | **   | ** | ** | **    | **    | 0.000 | 0 | 45 |
| 47 | - | 940   | 960  | 0  | 0  | -940  | -960  | 0.000 | 0 | 47 |
| 49 | + | -980  | -960 | 0  | 0  | 980   | 960   | 0.000 | 0 | 49 |
| 51 | 0 | **    | **   | ** | ** | **    | **    | 0.000 | 0 | 51 |
| 53 | - | 1060  | 1080 | 0  | 0  | -1060 | -1080 | 3.000 | 1 | 53 |
| 55 | + | -1100 | -1080| 0  | 0  | 1100  | 1080  | 3.000 | 1 | 55 |

FIG.11a

OUTPUT#1 = 20 ∅ SHIFT;
OUTPUT#2 = 40 ∅ SHIFT;
OUTPUT#3 = 60 ∅ SHIFT;

| HARMONIC ORDER | PSHAQSE | OUTPUT #1 | | OUTPUT #2 | | OUTPUT #3 | | VECTORIAL SUM REFLECTED TO INPUT | NORMALIZED VECTORIAL SUM REFLECTED TO INPUT | HARMONIC ORDER |
|---|---|---|---|---|---|---|---|---|---|---|
| | | HARM PHASE SHIFT | REFLECTED INPUT CURRENT SHIFT | HARM PHASE SHIFT | REFLECTED INPUT CURRENT SHIFT | HARM PHASE SHIFT | REFLECTED INPUT CURRENT SHIFT | | | |
| 1 | + | −20 | 0 | 40 | 0 | 60 | 0 | 3.000 | 1 | 1 |
| 3 | 0 | ** | ** | ** | ** | ** | ** | 0.000 | 0 | 3 |
| 5 | − | 100 | 120 | 200 | 240 | 300 | 360 | 0.000 | 0 | 5 |
| 7 | + | −140 | 120 | 280 | 240 | −420 | 360 | 0.000 | 0 | 7 |
| 9 | 0 | ** | ** | ** | ** | ** | ** | 0.000 | 0 | 9 |
| 11 | − | 220 | 240 | −440 | 480 | 660 | 720 | 0.000 | 0 | 11 |
| 13 | + | −260 | 240 | 520 | 480 | −780 | 720 | 0.000 | 0 | 13 |
| 15 | 0 | ** | ** | ** | ** | ** | ** | 0.000 | 0 | 15 |
| 17 | − | 340 | 360 | −680 | 720 | 1020 | 1080 | 3.000 | 1 | 17 |
| 19 | + | −380 | 360 | 760 | 720 | −1140 | 1080 | 3.000 | 1 | 19 |
| 21 | 0 | ** | ** | ** | ** | ** | ** | 0.000 | 0 | 21 |
| 23 | − | 460 | 480 | −920 | 960 | 1380 | 1440 | 0.000 | 0 | 23 |
| 25 | + | −500 | 480 | 1000 | 960 | −1500 | 1440 | 0.000 | 0 | 25 |
| 27 | 0 | ** | ** | ** | ** | ** | ** | 0.000 | 0 | 27 |
| 29 | − | 580 | 600 | −1160 | 1200 | 1740 | 1800 | 0.000 | 0 | 29 |
| 31 | + | −620 | 600 | 1240 | 1200 | −1860 | 1800 | 0.000 | 0 | 31 |
| 33 | 0 | ** | ** | ** | ** | ** | ** | 0.000 | 0 | 33 |
| 35 | − | 700 | 720 | −1400 | 1440 | 2100 | 2160 | 3.000 | 1 | 35 |
| 37 | + | −740 | 720 | 1480 | 1440 | −2220 | 2160 | 3.000 | 1 | 37 |
| 39 | 0 | ** | ** | ** | ** | ** | ** | 0.000 | 0 | 39 |
| 41 | − | 820 | 840 | −1640 | 1680 | 2460 | 2520 | 0.000 | 0 | 41 |
| 43 | + | −860 | 840 | 1720 | 1680 | −2580 | 2520 | 0.000 | 0 | 43 |
| 45 | 0 | ** | ** | ** | ** | ** | ** | 0.000 | 0 | 45 |
| 47 | − | 940 | 960 | −1880 | 1920 | 2820 | 2880 | 0.000 | 0 | 47 |
| 49 | + | −980 | 960 | 1960 | 1920 | −2940 | 2880 | 0.000 | 0 | 49 |
| 51 | 0 | ** | ** | ** | ** | ** | ** | 0.000 | 0 | 51 |
| 53 | − | 1060 | 1080 | −2120 | 2160 | 3180 | 3240 | 3.000 | 1 | 53 |
| 55 | + | −1100 | 1080 | 2200 | 2160 | −3300 | 3240 | 3.000 | 1 | 55 |

FIG. 11b

OUTPUT #1 =   0 ø SHIFT;
OUTPUT #2 =  18 ø SHIFT;

| HARMONIC ORDER | PHASE SEQUENCE | OUTPUT #1 HARM PHASE SHIFT | OUTPUT #1 REFLECTED INPUT CURRENT SHIFT | OUTPUT #2 HARM PHASE SHIFT | OUTPUT #2 REFLECTED INPUT CURRENT SHIFT | VECTORIAL SUM REFLECTED TO INPUT | NORMALIZED VECTORIAL SUM REFLECTED TO INPUT | HARMONIC ORDER |
|---|---|---|---|---|---|---|---|---|
| 1  | + | 0  | 0  | 18   | 18  | 2.000 | 1.000 | 1  |
| 3  | 0 | ** | ** | **   | **  | 0.000 | 0.000 | 3  |
| 5  | − | 0  | 0  | 90   | 108 | 1.176 | 0.588 | 5  |
| 7  | + | 0  | 0  | 126  | 108 | 1.176 | 0.588 | 7  |
| 9  | 0 | ** | ** | **   | **  | 0.000 | 0.000 | 9  |
| 11 | − | 0  | 0  | −198 | 216 | 0.618 | 0.309 | 11 |
| 13 | + | 0  | 0  | 234  | 216 | 0.618 | 0.309 | 13 |
| 15 | 0 | ** | ** | **   | **  | 0.000 | 0.000 | 15 |
| 17 | − | 0  | 0  | −306 | 324 | 1.902 | 0.951 | 17 |
| 19 | + | 0  | 0  | 342  | 324 | 1.902 | 0.951 | 19 |
| 21 | 0 | ** | ** | **   | **  | 0.000 | 0.000 | 21 |
| 23 | − | 0  | 0  | −414 | 432 | 1.618 | 0.809 | 23 |
| 25 | + | 0  | 0  | 450  | 432 | 1.618 | 0.809 | 25 |
| 27 | 0 | ** | ** | **   | **  | 0.000 | 0.000 | 27 |
| 29 | − | 0  | 0  | −522 | 540 | 0.000 | 0.000 | 29 |
| 31 | + | 0  | 0  | 558  | 540 | 0.000 | 0.000 | 31 |
| 33 | 0 | ** | ** | **   | **  | 0.000 | 0.000 | 33 |
| 35 | − | 0  | 0  | −630 | 648 | 1.618 | 0.809 | 35 |
| 37 | + | 0  | 0  | 666  | 648 | 1.618 | 0.809 | 37 |
| 39 | 0 | ** | ** | **   | **  | 0.000 | 0.000 | 39 |
| 41 | − | 0  | 0  | −738 | 756 | 1.902 | 0.951 | 41 |
| 43 | + | 0  | 0  | 774  | 756 | 1.902 | 0.951 | 43 |
| 45 | 0 | ** | ** | **   | **  | 0.000 | 0.000 | 45 |
| 47 | − | 0  | 0  | −846 | 864 | 0.618 | 0.309 | 47 |
| 49 | + | 0  | 0  | 882  | 864 | 0.618 | 0.309 | 49 |
| 51 | 0 | ** | ** | **   | **  | 0.000 | 0.000 | 51 |
| 53 | − | 0  | 0  | −954 | 972 | 1.176 | 0.588 | 53 |
| 55 | + | 0  | 0  | 990  | 972 | 1.176 | 0.588 | 55 |

FIG. 12

OUTPUT#1 = −7.5 ø SHIFT;
OUTPUT#2 = −15 ø SHIFT;

| HARMONIC | PHASE SEQUENCE | OUTPUT #1 HARM PHASE SHIFT | OUTPUT #1 REFLECTED INPUT CURRENT SHIFT | OUTPUT #2 HARM PHASE SHIFT | OUTPUT #2 REFLECTED INPUT CURRENT SHIFT | VECTORIAL SUM REFLECTED TO INPUT | NORMALIZED VECTORIAL SUM REFLECTED TO INPUT | HARMONIC |
|---|---|---|---|---|---|---|---|---|
| 1  | + | −7.5   | −7.5  | −15  | −15  | 2.000 | 1.000 | 1  |
| 3  | 0 | **     | **    | **   | **   | 0.000 | 0.000 | 3  |
| 5  | − | −37.5  | −45   | −75  | −90  | 1.848 | 0.924 | 5  |
| 7  | + | 52.5   | −45   | 105  | −90  | 1.848 | 0.924 | 7  |
| 9  | 0 | **     | **    | **   | **   | 0.000 | 0.000 | 9  |
| 11 | − | −82.5  | −90   | −165 | −180 | 1.414 | 0.707 | 11 |
| 13 | + | 97.5   | −90   | 195  | −180 | 1.414 | 0.707 | 13 |
| 15 | 0 | **     | **    | **   | **   | 0.000 | 0.000 | 15 |
| 17 | − | −127.5 | −135  | −255 | −270 | 0.765 | 0.383 | 17 |
| 19 | + | 142.5  | −135  | 285  | −270 | 0.765 | 0.383 | 19 |
| 21 | 0 | **     | **    | **   | **   | 0.000 | 0.000 | 21 |
| 23 | − | −172.5 | −180  | −345 | −360 | 0.000 | 0.000 | 23 |
| 25 | + | 187.5  | −180  | 375  | −360 | 0.000 | 0.000 | 25 |
| 27 | 0 | **     | **    | **   | **   | 0.000 | 0.000 | 27 |
| 29 | − | −217.5 | −225  | −435 | −450 | 0.765 | 0.383 | 29 |
| 31 | + | 232.5  | −225  | 465  | −450 | 0.765 | 0.383 | 31 |
| 33 | 0 | **     | **    | **   | **   | 0.000 | 0.000 | 33 |
| 35 | − | −262.5 | −270  | −525 | −540 | 1.414 | 0.707 | 35 |
| 37 | + | 277.5  | −270  | 555  | −540 | 1.414 | 0.707 | 37 |
| 39 | 0 | **     | **    | **   | **   | 0.000 | 0.000 | 39 |
| 41 | − | −307.5 | −315  | −615 | −630 | 1.848 | 0.924 | 41 |
| 43 | + | 322.5  | −315  | 645  | −630 | 1.848 | 0.924 | 43 |
| 45 | 0 | **     | **    | **   | **   | 0.000 | 0.000 | 45 |
| 47 | − | −352.5 | −360  | −705 | −720 | 2.000 | 1.000 | 47 |
| 49 | + | 367.5  | −360  | 735  | −720 | 2.000 | 1.000 | 49 |
| 51 | 0 | **     | **    | **   | **   | 0.000 | 0.000 | 51 |
| 53 | − | −397.5 | −405  | −795 | −810 | 1.848 | 0.924 | 53 |
| 55 | + | 412.5  | −405  | 825  | −810 | 1.848 | 0.924 | 55 |

FIG. 13

| OUTPUT #1 = | 12 ø SHIFT; | OUTPUT #4 | 48 ø SHIFT |
| --- | --- | --- | --- |
| OUTPUT #2 = | 24 ø SHIFT; | OUTPUT #5 | 60 ø SHIFT |
| OUTPUT #3 = | 36 ø SHIFT; | | |

| HARMONIC | PHASE SEQUENCE | OUTPUT #1 | | OUTPUT #2 | | OUTPUT #3 | |
| --- | --- | --- | --- | --- | --- | --- | --- |
| | | HARM PHASE SHIFT | REFLECTED INPUT CURRENT SHIFT | HARM PHASE SHIFT | REFLECTED INPUT CURRENT SHIFT | HARM PHASE SHIFT | REFLECTED INPUT CURRENT SHIFT |
| 1 | + | −12 | 0 | −24 | 0 | −36 | 0 |
| 3 | 0 | " | " | " | " | " | " |
| 5 | − | 60 | 72 | 120 | 144 | 180 | 216 |
| 7 | + | −84 | 72 | −168 | 144 | −252 | 216 |
| 9 | 0 | " | " | " | " | " | " |
| 11 | − | 132 | 144 | 264 | 288 | 396 | 432 |
| 13 | + | −156 | 144 | −312 | 288 | −468 | 432 |
| 15 | 0 | " | " | " | " | " | " |
| 17 | − | 204 | 216 | 408 | 432 | 612 | 648 |
| 19 | + | −228 | 216 | −456 | 432 | −684 | 648 |
| 21 | 0 | " | " | " | " | " | " |
| 23 | − | 276 | 288 | 552 | 576 | 828 | 864 |
| 25 | + | −300 | 288 | −600 | 576 | −900 | 864 |
| 27 | 0 | " | " | " | " | " | " |
| 29 | − | 348 | 360 | 696 | 720 | 1044 | 1080 |
| 31 | + | −372 | 360 | −744 | 720 | −1116 | 1080 |
| 33 | 0 | " | " | " | " | " | " |
| 35 | − | 420 | 432 | 840 | 864 | 1260 | 1296 |
| 37 | + | −444 | 432 | −888 | 864 | −1332 | 1296 |
| 39 | 0 | " | " | " | " | " | " |
| 41 | − | 492 | 504 | 984 | 1008 | 1476 | 1512 |
| 43 | + | −516 | 504 | −1032 | 1008 | −1548 | 1512 |
| 45 | 0 | " | " | " | " | " | " |
| 47 | − | 564 | 576 | 1128 | 1152 | 1692 | 1728 |
| 49 | + | −588 | 576 | −1176 | 1152 | −1764 | 1728 |
| 51 | 0 | " | " | " | " | " | " |
| 53 | − | 636 | 648 | 1272 | 1296 | 1908 | 1944 |
| 65 | + | −660 | 648 | −1320 | 1296 | −1980 | 1944 |

FIG. 14a

| OUTPUT #4 | | OUTPUT #5 | | VECTORIAL SUM REFLECTED INPUT | NORMALIZED VECTORIAL SUM REFLECTED INPUT | HARMONIC |
|---|---|---|---|---|---|---|
| HARM PHASE SHIFT | REFLECTED INPUT CURRENT SHIFT | HARM PHASE SHIFT | REFLECTED INPUT CURRENT SHIFT | | | |
| −48 | 0 | −60 | 0 | 5.00 | 1 | 1 |
| ″ | ″ | ″ | ″ | 0.00 | 0 | 3 |
| 240 | 288 | 300 | 360 | 0.00 | 0 | 5 |
| −336 | 288 | −420 | 360 | 0.00 | 0 | 7 |
| ″ | ″ | ″ | ″ | 0.00 | 0 | 9 |
| 528 | 576 | 660 | 720 | 0.00 | 0 | 11 |
| −624 | 576 | −780 | 720 | 0.00 | 0 | 13 |
| ″ | ″ | ″ | ″ | 0.00 | 0 | 15 |
| 816 | 864 | 1020 | 1080 | 0.00 | 0 | 17 |
| −912 | 864 | −1140 | 1080 | 0.00 | 0 | 19 |
| ″ | ″ | ″ | ″ | 0.00 | 0 | 21 |
| 1104 | 1152 | 1380 | 1440 | 0.00 | 0 | 23 |
| −1200 | 1152 | −1500 | 1440 | 0.00 | 0 | 25 |
| ″ | ″ | ″ | ″ | 0.00 | 0 | 27 |
| 1392 | 1440 | 1740 | 1800 | 5.00 | 1 | 29 |
| −1488 | 1440 | −1860 | 1800 | 5.00 | 1 | 31 |
| ″ | ″ | ″ | ″ | 0.00 | 0 | 33 |
| 1680 | 1728 | 2100 | 2160 | 0.00 | 0 | 35 |
| −1776 | 1728 | −2220 | 2160 | 0.00 | 0 | 37 |
| ″ | ″ | ″ | ″ | 0.00 | 0 | 39 |
| 1968 | 2016 | 2460 | 2520 | 0.00 | 0 | 41 |
| −2064 | 2016 | −2580 | 2520 | 0.00 | 0 | 43 |
| ″ | ″ | ″ | ″ | 0.00 | 0 | 45 |
| 2256 | 2304 | 2820 | 2880 | 0.00 | 0 | 47 |
| −2352 | 2304 | −2940 | 2880 | 0.00 | 0 | 49 |
| ″ | ″ | ″ | ″ | 0.00 | 0 | 51 |
| 2544 | 2592 | 3180 | 3240 | 0.00 | 0 | 53 |
| −2640 | 2592 | −3300 | 3240 | 0.00 | 0 | 55 |

FIG. 14b

OUTPUT #1 = 10 ØSHIFT;    OUTPUT #4 = 40 ØSHIFT
OUTPUT #2 = 20 ØSHIFT;    OUTPUT #5 = 50 ØSHIFT
OUTPUT #3 = 30 ØSHIFT;    OUTPUT #6 = 60 ØSHIFT

| HARMONIC NUMBER | PHASE MEASURE SENSE | OUTPUT | | OUTPUT | | OUTPUT | | OUTPUT | |
|---|---|---|---|---|---|---|---|---|---|
| | | HARM PHASE SHIFT | REFLECTED INPUT CURRENT SHIFT | HARM PHASE SHIFT | REFLECTED INPUT CURRENT SHIFT | HARM PHASE SHIFT | REFLECTED INPUT CURRENT SHIFT | HARM PHASE SHIFT | REFLECTED INPUT CURRENT SHIFT |
| 1 | + | −10 | 0 | −20 | 0 | −30 | 0 | −40 | 0 |
| | − | 0 | 0 | 0 | 0 | 0 | 0 | 0 | 0 |
| 3 | + | 50 | 60 | 100 | 120 | 150 | 180 | 200 | 240 |
| 5 | − | −70 | 60 | −140 | 120 | −210 | 180 | −280 | 240 |
| | + | 110 | 120 | 220 | 240 | 330 | 360 | 440 | 480 |
| 7 | − | −130 | 120 | −260 | 240 | −390 | 360 | −520 | 480 |
| | + | 170 | 180 | 340 | 360 | 510 | 540 | 680 | 720 |
| 9 | − | −190 | 180 | −380 | 360 | −570 | 540 | −760 | 720 |
| | + | 230 | 240 | 460 | 480 | 690 | 720 | 920 | 960 |
| 11 | − | −250 | 240 | −500 | 480 | −750 | 720 | −1000 | 960 |
| | + | 290 | 300 | 580 | 600 | 870 | 900 | 1160 | 1200 |
| 13 | − | −310 | 300 | −620 | 600 | −930 | 900 | −1240 | 1200 |
| | + | 350 | 360 | 700 | 720 | 1050 | 1080 | 1400 | 1440 |
| 15 | − | −370 | 360 | −740 | 720 | −1110 | 1080 | −1480 | 1440 |
| | + | 410 | 420 | 820 | 840 | 1230 | 1260 | 1640 | 1680 |
| 17 | − | −430 | 420 | −860 | 840 | −1290 | 1260 | −1720 | 1680 |
| | + | 470 | 480 | 940 | 960 | 1410 | 1440 | 1880 | 1920 |
| 19 | − | −490 | 480 | −980 | 960 | −1470 | 1440 | −1960 | 1920 |
| | + | 530 | 540 | 1060 | 1080 | 1590 | 1620 | 2120 | 2160 |
| | − | −550 | 540 | −1100 | 1080 | −1650 | 1620 | −2200 | 2160 |

(Harmonic numbers column: 1, 3, 5, 7, 9, 11, 13, 15, 17, 19, 21, 23, 25, 27, 29, 31, 33, 35, 37, 39, 41, 43, 45, 47, 49, 51, 53, 55)

FIG. 15a

| OUTPUT | | OUTPUT | | | | HARMONIC |
|---|---|---|---|---|---|---|
| HARM PHASE SHIFT | REFECTED INPUT CURRENT SHIFT | HARM PHASE SHIFT | REFECTED INPUT CURRENT SHIFT | VECTORIAL SUM REFECTED INPUT | NORMALIZED VECTORIAL SUM REFECTED INPUT | HOARD MEMORNIC |
| −50 | 0 | −60 | 0 | 6.000 | 1 | 1 |
| ·· | ·· | ·· | ·· | 0.000 | 0 | 3 |
| 250 | 300 | 300 | 360 | 0.000 | 0 | 5 |
| −350 | 300 | −420 | 360 | 0.000 | 0 | 7 |
| ·· | ·· | ·· | ·· | 0.000 | 0 | 9 |
| 550 | 600 | 660 | 720 | 0.000 | 0 | 11 |
| −650 | 600 | −780 | 720 | 0.000 | 0 | 13 |
| ·· | ·· | ·· | ·· | 0.000 | 0 | 15 |
| 850 | 900 | 1020 | 1080 | 0.000 | 0 | 17 |
| −950 | 900 | −1140 | 1080 | 0.000 | 0 | 19 |
| ·· | ·· | ·· | ·· | 0.000 | 0 | 21 |
| 1150 | 1200 | 1380 | 1440 | 0.000 | 0 | 23 |
| −1250 | 1200 | −1500 | 1440 | 0.000 | 0 | 25 |
| ·· | ·· | ·· | ·· | 0.000 | 0 | 27 |
| 1450 | 1500 | 1740 | 1800 | 0.000 | 0 | 29 |
| −1550 | 1500 | −1860 | 1800 | 0.000 | 0 | 31 |
| ·· | ·· | ·· | ·· | 0.000 | 0 | 33 |
| 1750 | 1800 | 2100 | 2160 | 6.000 | 1 | 35 |
| −1850 | 1800 | −2220 | 2160 | 6.000 | 1 | 37 |
| ·· | ·· | ·· | ·· | 0.000 | 0 | 39 |
| 2050 | 2100 | 2460 | 2520 | 0.000 | 0 | 41 |
| −2150 | 2100 | −2580 | 2520 | 0.000 | 0 | 43 |
| ·· | ·· | ·· | ·· | 0.000 | 0 | 45 |
| 2350 | 2400 | 2820 | 2880 | 0.000 | 0 | 47 |
| −2450 | 2400 | −2940 | 2880 | 0.000 | 0 | 49 |
| ·· | ·· | ·· | ·· | 0.000 | 0 | 51 |
| 2650 | 2700 | 3180 | 3240 | 0.000 | 0 | 53 |
| −2750 | 2700 | −3300 | 3240 | 0.000 | 0 | 55 |

FIG.15b

| HARMONIC NUMBER | NORMALIZED OUTPUT USING A 2 WYE SECONDARY XFMR DA=30 DEG | NORMALIZED OUTPUT USING A 2 WYE SECONDARY XFMR DA=18 DEG | NORMALIZED OUTPUT USING A 3 WYE SECONDARY XFMR DA=20 DEG | NORMALIZED OUTPUT USING A 4 WYE SECONDARY XFMR DA=15 DEG | NORMALIZED OUTPUT USING A 5 WYE SECONDARY XFMR DA=12 DEG | NORMALIZED OUTPUT USING A 6 WYE SECONDARY XFMR DA=10 DEG | HARMONIC NUMBER |
|---|---|---|---|---|---|---|---|
| 1 | 1.000 | 1.000 | 1.000 | 1.000 | 1.000 | 1.000 | 1 |
| 3 | 0.000 | 0.000 | 0.000 | 0.000 | 0.000 | 0.000 | 3 |
| 5 | 0.000 | 0.588 | 0.000 | 0.000 | 0.000 | 0.000 | 5 |
| 7 | 0.000 | 0.588 | 0.000 | 0.000 | 0.000 | 0.000 | 7 |
| 9 | 0.000 | 0.000 | 0.000 | 0.000 | 0.000 | 0.000 | 9 |
| 11 | 1.000 | 0.309 | 0.000 | 0.000 | 0.000 | 0.000 | 11 |
| 13 | 1.000 | 0.309 | 0.000 | 0.000 | 0.000 | 0.000 | 13 |
| 15 | 0.000 | 0.000 | 0.000 | 0.000 | 0.000 | 0.000 | 15 |
| 17 | 0.000 | 0.951 | 1.000 | 0.000 | 0.000 | 0.000 | 17 |
| 19 | 0.000 | 0.951 | 1.000 | 0.000 | 0.000 | 0.000 | 19 |
| 21 | 0.000 | 0.000 | 0.000 | 0.000 | 0.000 | 0.000 | 21 |
| 23 | 1.000 | 0.809 | 0.000 | 1.000 | 1.000 | 0.000 | 23 |
| 25 | 1.000 | 0.809 | 0.000 | 1.000 | 1.000 | 0.000 | 25 |
| 27 | 0.000 | 0.000 | 0.000 | 0.000 | 0.000 | 0.000 | 27 |
| 29 | 0.000 | 0.000 | 1.000 | 0.000 | 0.000 | 0.000 | 29 |
| 31 | 0.000 | 0.000 | 1.000 | 0.000 | 0.000 | 0.000 | 31 |
| 33 | 0.000 | 0.000 | 0.000 | 0.000 | 0.000 | 0.000 | 33 |
| 35 | 1.000 | 0.809 | 0.000 | 0.000 | 0.000 | 1.000 | 35 |
| 37 | 1.000 | 0.809 | 0.000 | 0.000 | 0.000 | 1.000 | 37 |
| 39 | 0.000 | 0.000 | 0.000 | 0.000 | 0.000 | 0.000 | 39 |
| 41 | 0.000 | 0.951 | 0.000 | 1.000 | 0.000 | 0.000 | 41 |
| 43 | 0.000 | 0.951 | 0.000 | 1.000 | 0.000 | 0.000 | 43 |
| 45 | 0.000 | 0.000 | 0.000 | 0.000 | 0.000 | 0.000 | 45 |
| 47 | 1.000 | 0.309 | 0.000 | 0.000 | 0.000 | 0.000 | 47 |
| 49 | 1.000 | 0.309 | 0.000 | 0.000 | 0.000 | 0.000 | 49 |
| 51 | 0.000 | 0.000 | 0.000 | 0.000 | 0.000 | 0.000 | 51 |
| 53 | 0.000 | 0.588 | 0.000 | 0.000 | 0.000 | 0.000 | 53 |
| 55 | 0.000 | 0.588 | 1.000 | 0.000 | 0.000 | 0.000 | 55 |

FIG. 16

HARMONIC CANCELLATION SYSTEM

This application is a continuation of application Ser. No. 07/992,061, filed Dec. 16, 1992 now abandoned, which is a continuation-in-part of U.S. application Ser. No. 07/792,893, filed Nov. 15, 1991, now U.S. Pat. No. 5,206,539 issued Apr. 27, 1993.

BACKGROUND OF THE INVENTION

1. Field of the Invention

The present invention relates to electrical power systems in general, and in particular to a device which eliminates unwanted harmonics in a variety of electrical power system applications. The present invention also relates to a polyphase voltage transformer which magnetically cancels harmonic currents caused by nonlinear loads.

2. Description of Related Art

Harmonic currents present in a power distribution network can present significant problems, including power losses, overheating, resonances and overvoltages, operational instability, and radio frequency disturbances. Any electronic circuit which presents a non-linear load to the power source will inherently generate harmonic currents. In many applications, for example at data processing and telecommunication sites, power distribution feeders may carry up to 80% harmonic currents. Power thyristors, rectifiers, and "switch mode" power supplies commonly used in data processing and telecommunications equipment are inherently non-linear and are a major cause of power supply degradation due to generation of harmonics.

A variety of systems have been proposed for on-site harmonic current reduction, including proposals involving use of multiple transformers or multi-phase transformers with delta coupled secondary windings. An example of the former, involving use of two single phase transformers having primary and secondary windings coupled in quadrature, together with "filtering" transformers between each of the taps, the filter transformers having a low impedance to desirable "phase equal" currents, is disclosed in U.S. Pat. No. 3,671,901. An example of the latter is disclosed in U.S. Pat. No. 4,779,189, which describes a system in which harmonics are essentially reduced by greatly increasing the number of phases at the output.

Another example of a prior attempt at on-site harmonic current reduction involves the inclusion of a dynamic stabilizer system that provides reactive power compensation by causing all three phases to be present in each combination of principal secondary windings and auxiliary secondary windings, the combination of phase rotation and positive leakage reactants in the system resulting in the selective cancellation of resonant currents produced in the dynamic stabilizer so that the harmonic currents are not present in the principal secondary windings, and therefore are not induced in the transformer core. Examples of this type of system are disclosed in U.S. Pat. Nos. 4,513,240 and 4,513,243.

Such solutions have proved to be impractical for many applications because they are either overly complex and therefore costly, excessively bulky, or inefficient. In the case of a transformer with delta connected secondary windings, for example, a 30° phase shift can be used to delete some lower order harmonics, but this configuration can only be used to power very specific types of three phase loads. Since the delta connected secondary does not have a natural neutral, single phase loads and three-phase delta loads present problems. Most of the other known systems for reducing harmonics have similarly limited application.

In contrast, the present invention provides a harmonic suppression transformer in which all significant harmonic currents may be completely cancelled. This is accomplished using multiple wye-connected three-phase secondary outputs, and by phase shifting the outputs in such a way that the harmonics magnetically cancel each other in the transformer core and/or primary coils. As a result, a variety of load types may be accommodated.

While the technique of providing multiple three-phase wye connected outputs has previously been proposed, the technique has heretofore not been applied in a way which would suppress harmonics. Instead, the technique has been used for providing multiple outputs phase shifted in respect to each other by 180°, as disclosed in U.S. Pat. No. 2,470,598. The 180° phase shift arrangement does not have the effect of cancelling harmonics.

Because it has previously been thought necessary to provide delta connected secondary windings for harmonic suppression purposes, with or without the addition of additional tuning or filtering means such as the filtering transformers disclosed in U.S. Pat. No. 3,671,901, cited above, or to provide stabilizers in connection with the connected secondaries as in U.S. Pat. Nos. 3,671,901, also cited above, those skilled in the art have heretofore been unable to take advantage of the simplicity and compatibility advantages of a wye connection in applications requiring harmonic current suppression without complex stabilizer and/or auxiliary winding systems.

SUMMARY OF THE INVENTION

In view of the heretofore unresolved need for a system which provides complete harmonic current suppression and which is nevertheless applicable to a wide variety of load types, it is an objective of the invention to provide a system capable of filtering harmonic currents by completely cancelling the harmonic currents, for any desired number of orders and for any fundamental frequency, while nevertheless using simple wye-connected outputs and a standard delta connected input for compatibility with a wide variety of power supply applications.

It is a further objective of the invention to provide a magnetic cancellation device for harmonic current suppression which can be packaged for use in a wide variety of applications, including fixed and/or mobile power distribution units, fixed and/or mobile harmonic cancellation units, as a load linearizer to isolate non-linear loads from other equipment, as a power factor correction device, and as a kilovolt-ampere (KVA) or apparent power conservation device.

It is yet another objective of the invention to provide a magnetic cancellation device capable of being connected to any or all of the following power sources:
  utility power
  a power conditioner such as a line regulator or a motor/alternator
  an uninterruptable power source (UPS)
  any other power source
and also to any or all of the following loads:
  passive loads
  linear loads non-linear loads
loads using active devices like semi-conductors.

In other words, it is an objective of the invention to provide a harmonic cancellation system which can be packaged in a convenient unit and yet which can be applied to any type of power input without affecting the power input regardless of the load.

These objectives of the invention are achieved by providing, according to a preferred embodiment of the invention, a power supply system which includes a magnetic cancellation device or transformer having multiple three-phase secondary output windings connected such that the windings are relatively phase-shifted to thereby prevent harmonic currents present in the output windings from being induced in the input winding, the magnetic flux vectors generated in the core by harmonic currents of selected orders adding to zero, or at least partially cancelling, for each respective selected order.

The magnitudes of the secondary output differential phase shifts required for cancellation are determined, according to the principles of the invention, by the distribution of the load harmonic currents, and the number of output windings. For example, for a three-phase two output transformer, constructed in accordance with a first embodiment of the invention, a relative secondary phase shift of 30° achieves complete cancellation of the fifth, seventh, seventeenth, and nineteenth harmonics. The eleventh and thirteenth harmonics are completely cancelled by a four output transformer having a relative phase shift of 15°, while triplens may be cancelled in either embodiment by a delta connected three wire primary. Additional embodiments of the invention can achieve total or partial cancellation of virtually any desired combination of harmonics, depending on the number of output windings and their relative phase shifts.

The preferred configuration has the advantage of requiring only a single core, thereby reducing the size and cost of the system (although multiple cores may be used if desired). Further, because the invention uses multiple wye secondaries, the system has the advantage that both single phase and of three-phase loads of various types can be powered safely.

It will be appreciated that the preferred embodiment of a transformer as shown in FIG. 1–6, described in detail below and also in parent application Ser. No. 07/792,893, filed Nov. 15, 1991, now U.S. Pat. No. 5,206,539 issued Apr. 27, 1993 is especially applicable for use as power distribution units for supplying computer grade power to data processing equipment, and also for main frame applications. This type of transformer provides complete isolation, distribution, control, and monitoring of AC power. The power distribution unit can include everything required to correctly interface the uninterruptable power source to its intended load.

BRIEF DESCRIPTION OF THE DRAWINGS

FIG. 7 is a table of relative magnitudes and phases for the vector diagram of FIG. 6.

FIG. 8(a) is a table illustrating the manner in which the preferred dual output transformer of FIG. 1 causes harmonic currents to be cancelled.

FIG. 8(b) is a table illustrating the effect of varying the primary to secondary phase angle in the transformer of FIG. 8(a).

FIG. 10 is a table illustrating the manner in which selected harmonic currents are cancelled by the transformer of FIG. 2.

FIG. 11(a) is a table illustrating the manner in which selected harmonic currents are cancelled by a transformer having three secondary windings relatively phase shifted by 20°.

FIG. 11(b) is a table illustrating the effect of varying the primary to secondary phase angle in the transformer of FIG. 11(a).

FIG. 12 is a table illustrating the manner in which selected harmonic currents are partially rather than completely cancelled by a transformer having two secondary windings relatively phase shifted by 18°.

FIG. 13 is a table illustrating the manner in which selected harmonic currents are partially cancelled by a transformer having two secondary windings relatively phase shifted by 7.5°.

FIGS. 14a and 14b are a table illustrating the manner in which selected harmonic currents are completely cancelled by a five output transformer with a relative secondary phase shift of 12°.

FIGS. 15a and 15b are a table illustrating the manner in which selected harmonic currents are completely cancelled by a six output transformer with a relative secondary phase shift of 10°.

FIG. 16 is a table summarizing the harmonic orders completely or partially cancelled by the respective exemplary two through six output transformers shown in FIGS. 8(a), 12, 11(a), 10, 14 and 15.

DETAILED DESCRIPTION OF THE PREFERRED EMBODIMENTS

Figure 1:
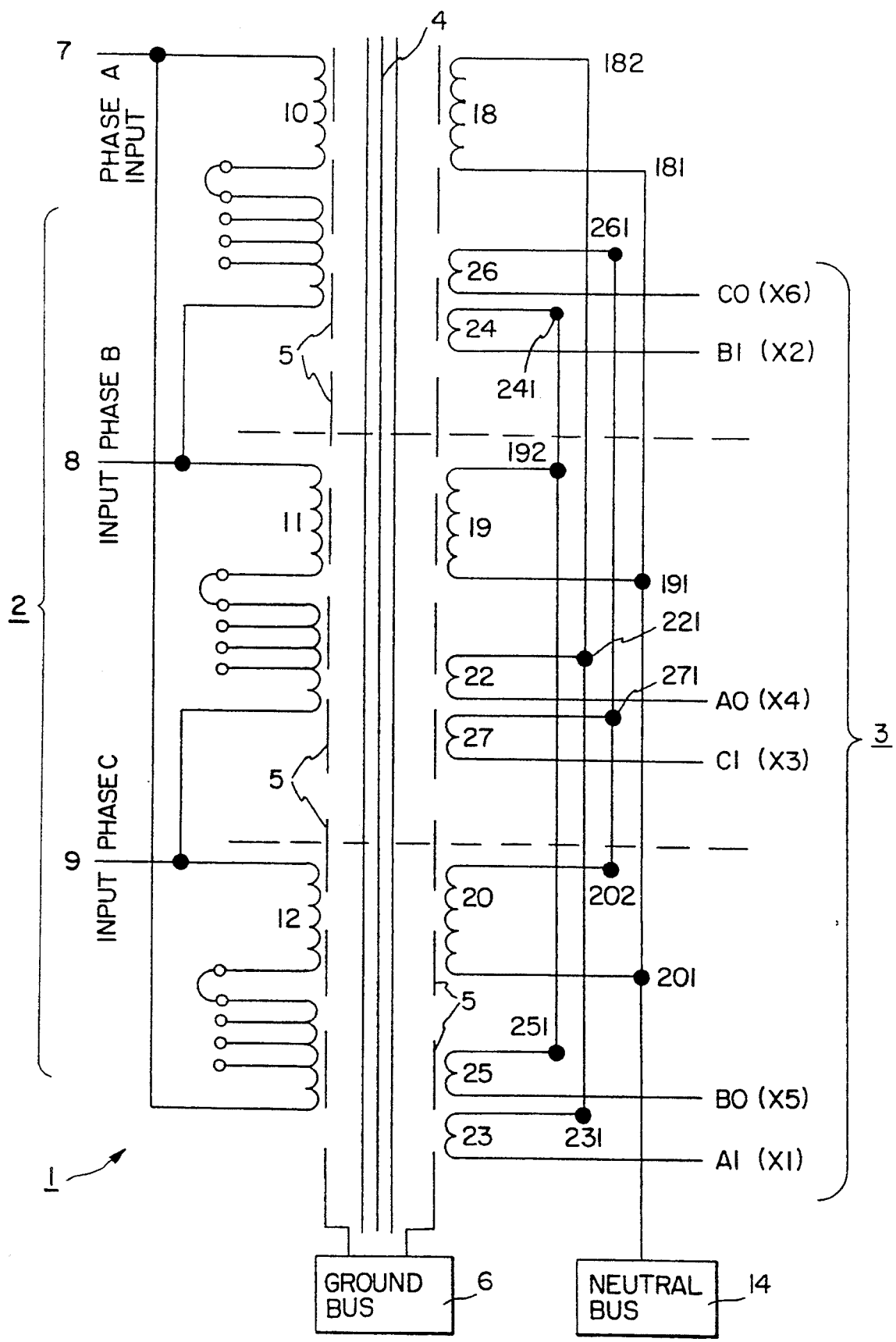
FIG. 1 is a schematic circuit diagram of a transformer having two wye-connected secondary output windings according to a preferred embodiment of the invention.

As shown in FIG. 1, a magnetic cancellation device or transformer 1 constructed according to a first preferred embodiment of the invention includes a three-phase primary input winding 2 and a three-phase secondary winding 3 made up of two three-phase secondary output windings. Transformer 1 also includes a core 4 and, optionally, shields 5 between the primary and secondary windings and the core, and connected to a common ground bus 6. The input winding, as is conventional, includes three input terminals 7–9 and three coils 10–12 preferably connected in delta configuration for each of the three phases A–C of the input, although the invention is not intended to be limited to any particular input winding configuration. The delta wound input has the advantage that "triplens", i.e., odd harmonic orders which are integer multiples of three, are cancelled by the delta input.

It will be appreciated that FIG. 1 is schematic in nature and does not show the actual physical construction of the core and windings. In practice, the windings are wound around the core and may overlap each other, while the core may have a wide variety of configurations. For example, the core may be a single core, or it may be formed from multiple cores, although it is an advantage of the invention that a single core may be used if desired. In addition, the core may be made of steel, although other magnetic materials may also be used as core materials. The invention is directed not to the core structure per se but to the connections between the secondary windings, and implementation of the invention will be readily understood by those skilled in the art based on the following description of the secondary winding connections.

The secondary winding of the transformer includes two separate output windings each having a phase A terminal, a phase B terminal, and a phase C terminal. These terminals are designated, respectively, as terminals A0, B0 and C0 for the first winding and terminals A1, B1 and C1 for the second winding. All of the secondary outputs preferably have matched impedances and voltages on a line-to-line and line-to-neutral basis. In addition, all secondary three-phase outputs should have a double current neutral connection, provided by neutral bus 14. This double current neutral must be provided if zero sequence harmonics are present, as these harmonics add directly in the neutral.

Each of the secondary windings in this embodiment is made up of four coils, including output or vector coils 22–27 for the respective phase-shifted outputs and in-phase main secondary coils 18–20. The wye connections for the two secondary outputs are as follows:

Connected to the neutral bus 14 are respective first ends 181, 191, and 201 of each of main secondary coils 18–20 for the three phases. The wye connections are formed by connecting respective second ends 182, 192, and 202 of coils 18–20 to first ends 221, 231, 241, 251, 261, and 271 of the respective pairs 22 and 23, 24 and 25, and 26 and 27 of the secondary vector coils 22–27. The second ends of vector coils 22–27 are respectively connected to output terminals A0–C0 and A1–C1, as shown in FIG. 1.

Vector coils 22–27 are arranged so that the magnetic fluxes induced in the core 4 due to harmonic currents present at secondary outputs A0–C1 will oppose each other, and therefore not induce corresponding currents in the input winding.

Complete magnetic cancellation of current induced fluxes in the core is achieved by phase shifting the secondary winding outputs by 30° for the two output transformer of FIG. 1, and more generally by an amount equal to 60° divided by the number of outputs. This phase shift is a relative shift between the respective outputs of the secondary winding. However, under certain circumstances, it may also be desirable, as will be explained in connection with the embodiment illustrated in FIG. 11, to select a phase shift which does not completely cancel harmonics, but rather which partially cancels certain harmonics. The reason is that different harmonics have different magnitudes and it may be less important to cancel some than to cancel others.

On the other hand, the primary-to-secondary winding phase shift can have any desired value without affecting harmonic current cancellation, as will be apparent from the following discussion.

The actual phase shift between the multiple secondary windings is determined by three factors. These factors are the harmonic order, degree of cancellation, and the phase sequence. The primary to secondary phase shift $\theta$ is given by the formula $$\theta_h = A_0 \pm (h \times A_0) \tag{1}$$

where h is the harmonic order and $A_0$ is the phase shift primary-to-secondary. Whether the phase is $\pm$ in equation 1 depends on the phase sequence of the harmonic order. The negative $(-)$ sign is used for negative sequence harmonics and the positive $(+)$ sign is used for positive sequence harmonics.

The table in FIG. 8(a) indicates the phase sequence and primary to secondary phase shifts for each harmonic order of the two output transformer of FIG. 1. Column 1 gives the harmonic order and column 2 gives the phase sequence. Columns 3 and 6 give respective harmonic phase shifts for the first and second outputs. These phase shifts are equal to the second term in equation 1, i.e., $h \times A_0$. Columns 4 and 7 are the total reflected input current phase shift, obtained by adding the initial primary to secondary phase shift $A_0$ to the entry in respective columns 3 and 6. Finally, columns 5 and 8 are equivalent angles to the angles in columns 4 and 7, normalized to be between zero and 360 degrees for illustrative purposes. The sum of columns 4 and 7 or 8 and 9 is given in the last column of Table 1.

It is apparent from FIG. 8(a) that, although $A_0$ is illustratively set at 15° for the first output winding and at 45° for the second output winding, the same results would be obtained for any pair of primary-to-secondary phase shifts, as long as the relative phase shift is 30°. For example, cancellation of harmonics would be equally effective for respective primary-to-secondary phase shifts of 0° and 30°, as shown in FIG. 8(b).

Multiples of the third harmonic order are cancelled out through use of the delta primary winding as noted above. Thus, their values are replaced in the tables by double asterisks. However, in the embodiments shown in FIGS. 8(a) and 8(b), harmonics 11 and 13, 23 and 25, and 35 and 37 are seen to be in the same direction for both outputs and therefore do not cancel.

On the other hand, by simply adding two more secondary windings, relatively phase shifted by 15° as shown in FIG. 10, the 11th, 13th, 35th and 37th orders can be cancelled, and by adding six more windings, all of the first 45 harmonics, at least, may be cancelled. FIGS. 11(a) and 14–15 respectively illustrate the results obtained by three, five, and six output transformers in which the outputs are relatively phase shifted by 60° divided by the number of outputs, for complete cancellation of selected harmonic orders. FIG. 11(b) shows a three output transformer similar to that of FIG. 11(a), but with a shifted primary to secondary phase difference.

Figure 2:
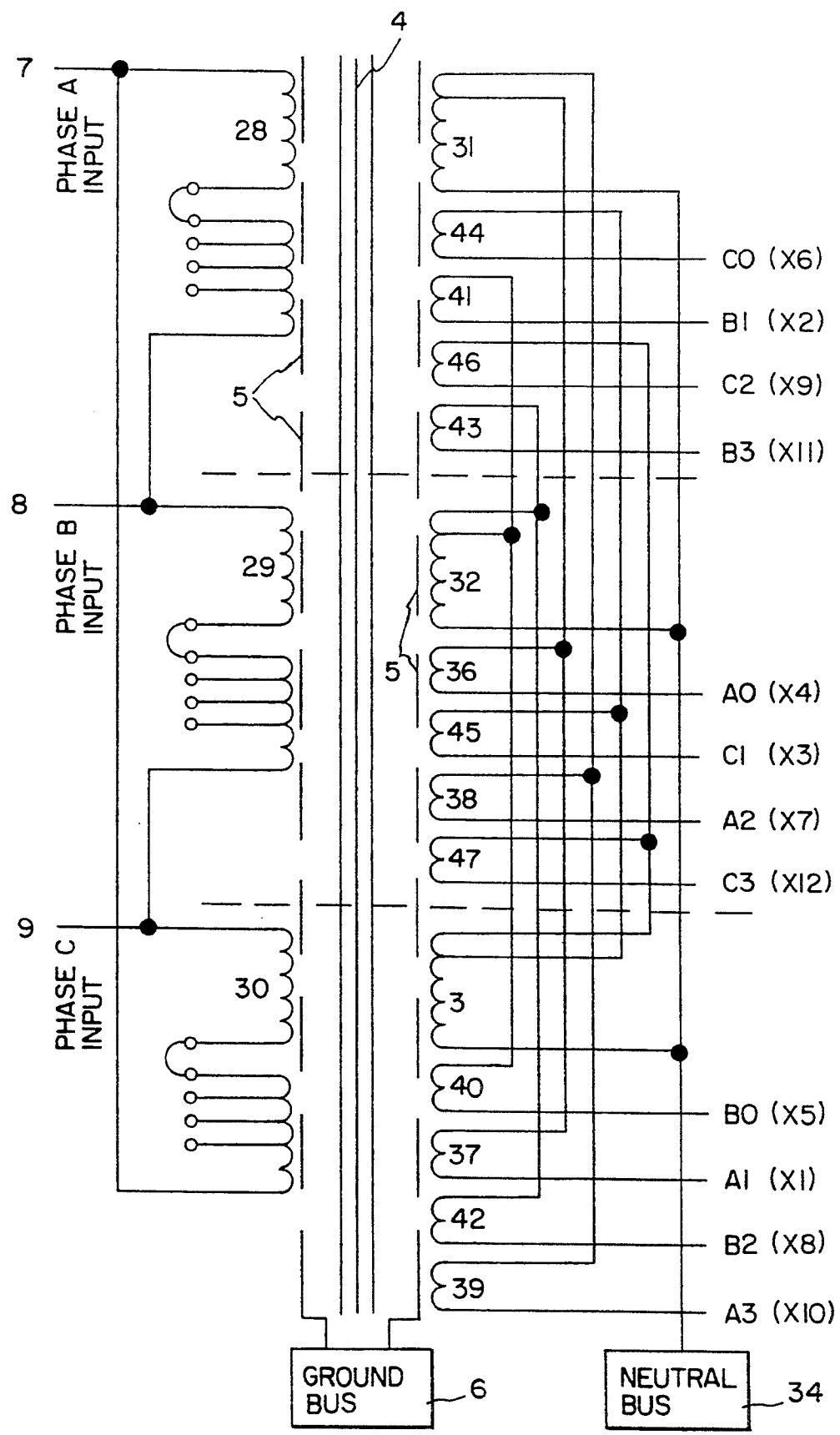
FIG. 2 is a schematic circuit diagram of a transformer having four wye-connected secondary output windings according to another preferred embodiment of the invention.

The wiring for the four output winding version is shown in FIG. 2, and the operation thereof is illustrated by the table of FIG. 10. In this version, the relative phase shift between outputs is 15°, such that output No. 1 is at 15°, output No. 2 is at 30°, output No. 3 is at 45°, and output No. 4 is at 60°. Thus, for the 11th harmonic, there are four outputs at, respectively, −180°, +180°, −180°, and +180°, and thus the outputs cancel.

Optionally, as illustrated, the output voltage for the four output three-phase transformer may be adjusted by adjusting the number of turns in each one of input coils 28–30 so as to match voltages and impedances, but otherwise the four output transformer uses the same delta connected input as the two output transformer. Again, three main secondary coils 31–33 are connected at one end to a neutral bus 34, and wye-connected at second ends, via vector coils 36–47, to the respective phase outputs A0–A3, B0–B3, and C0–C3. For simplicity, the ends of the respective coils are not numbered in FIG. 2.

Figures 4, 5:
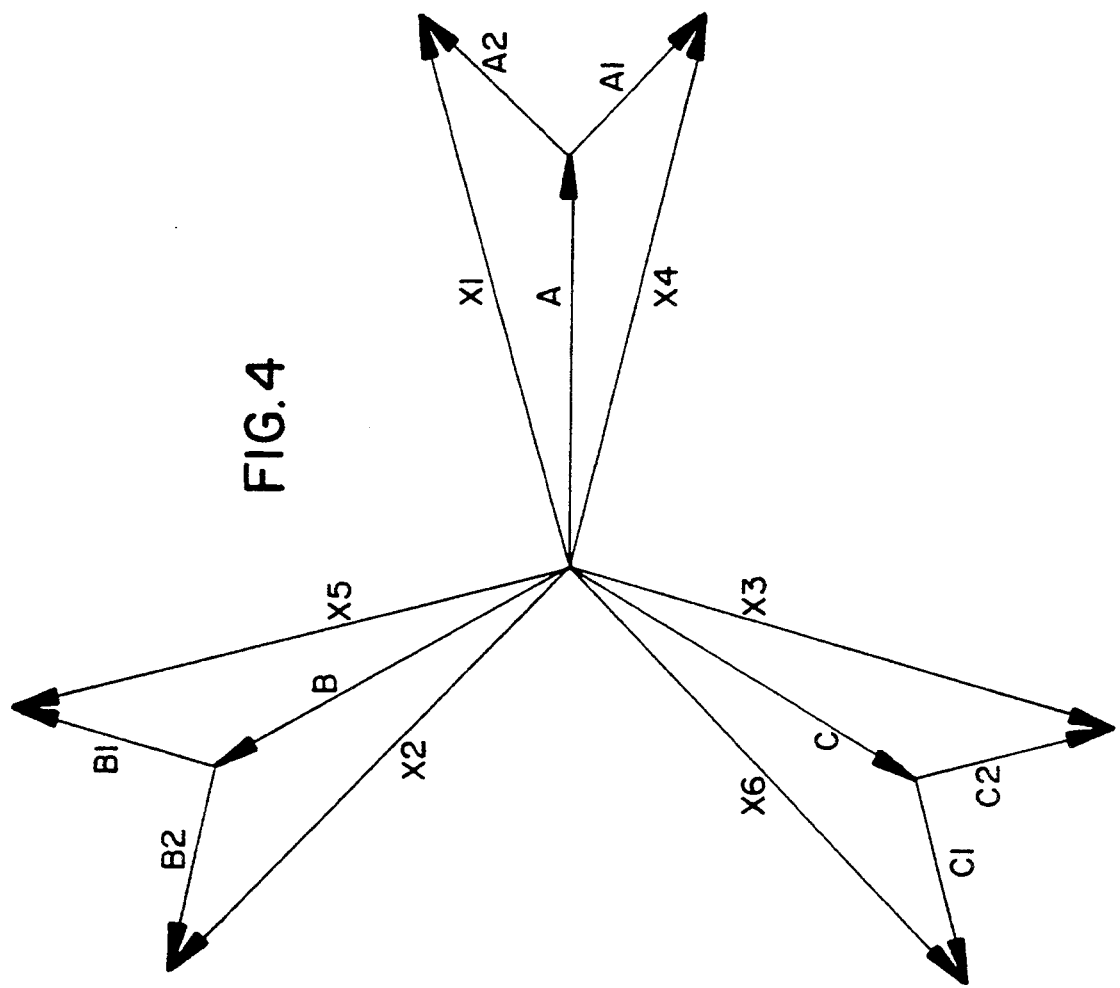
FIG. 4 is a vector diagram showing the relationship of the secondary winding phasors for the preferred dual output transformer of FIG. 1.
FIG. 5 is a table of relative magnitudes and phases for the vector diagram of FIG. 4.
Figure 6:
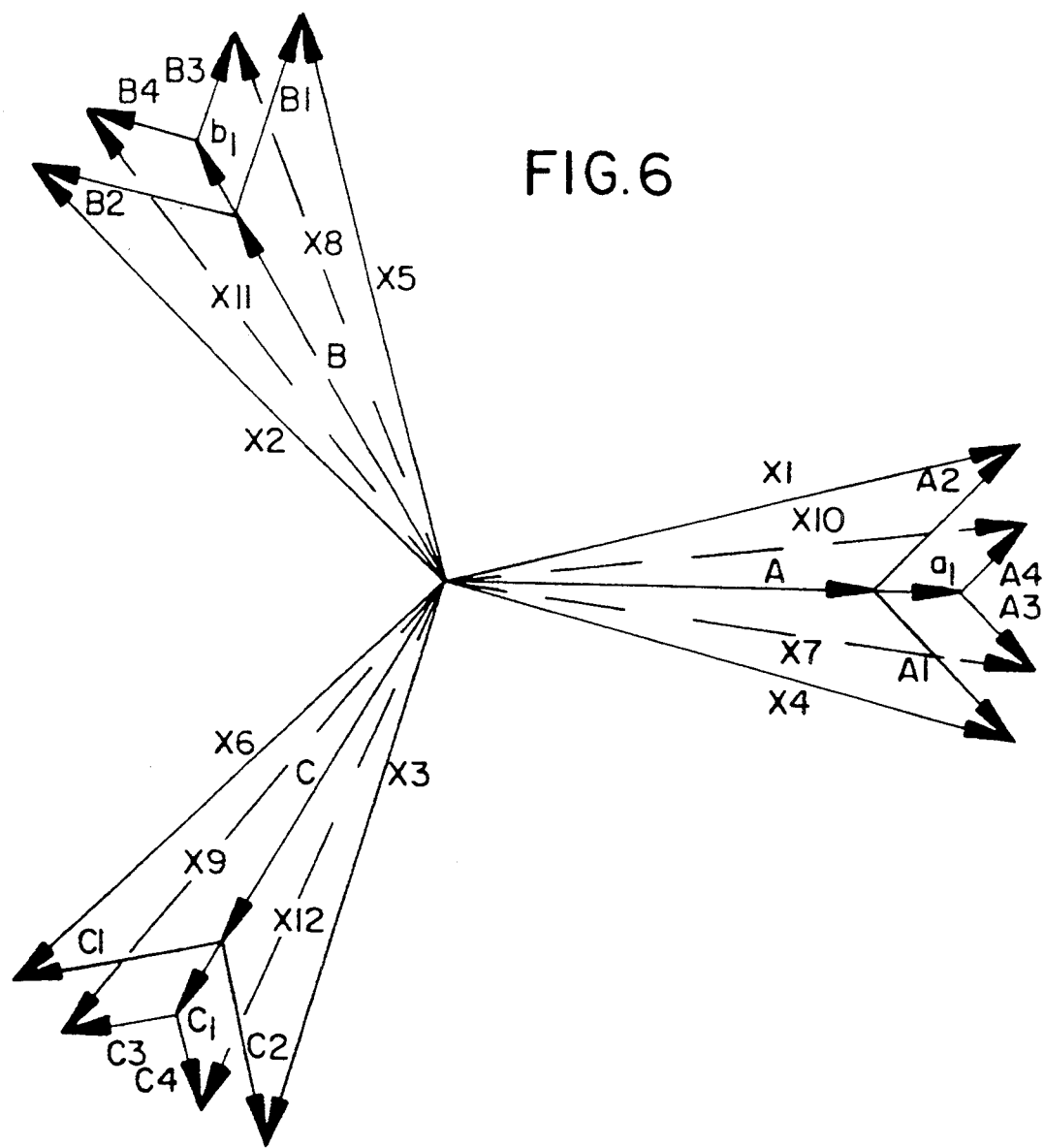
FIG. 6 is a vector diagram showing the relationship of the secondary winding phasors for the four output transformer of FIG. 2.

The operation of the invention can be further understood in reference to the vector or phasor diagrams of FIGS. 4–7. FIG. 4 shows current vectors for the coupling of the primary windings (vectors A, B, and C) and secondary windings (vectors X1–X6) of the two output transformer of FIG. 1. As is apparent from FIG. 4, with output phase A set at zero degrees, and pairs $(X_1, X_4)$, $(X_2, X_5)$, and $(X_3, X_6)$ at relative phase shifts of 30°, difference vectors A1, A2, B1, B2, C1 and C3 add to zero or 360°. The actual relative magnitudes and phase angles for the respective vectors are shown in FIG. 5. In the four output example of FIGS. 6 and 7, similar cancellation is obtained. Although difference vectors A3, A4, B3, B4, C3, and C4 are not shown in FIG. 7, they will also add to 360°.

Figure 3:
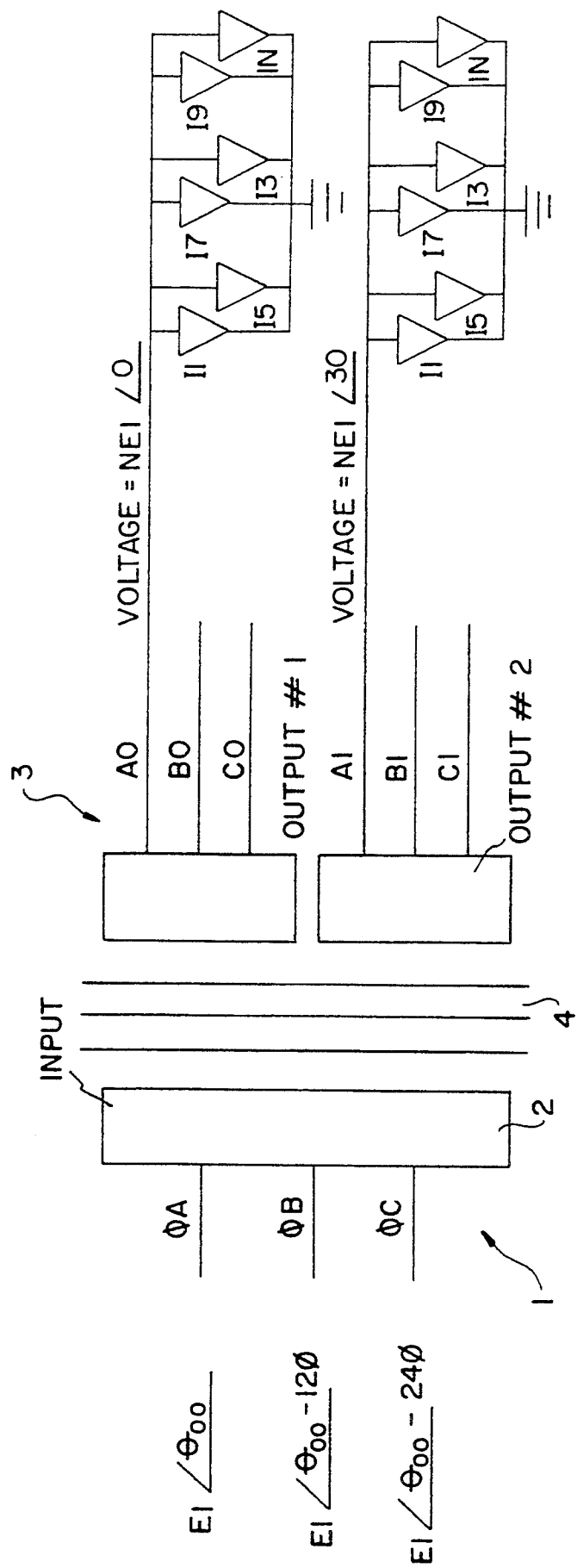
FIG. 3 is an equivalent circuit diagram for the preferred dual output transformer of FIG. 1.

The relationship between voltages and current is shown in FIG. 3, which is equivalent to FIG. 1 but includes a non-linear current load. The input voltages are given by E1, and the two output voltages by NE1, where N is the input-to-output turns ratio. I, I5, . . . IN correspond to all possible odd harmonic currents that can be generated in an AC system. I1 is the fundamental current. Output #1 phase A is the reference phase and is assigned a phase shift of zero, which is in phase with fundamental current I1.

Figure 9A:
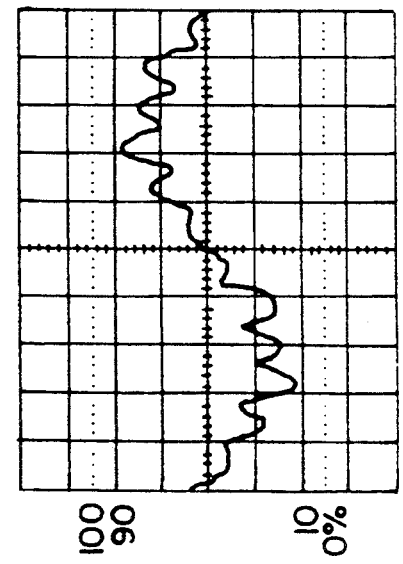
FIGS. 9(a), 9(b), and 9(c) are oscilloscope plots showing the input and outputs for the transformer of FIG. 1 when connected to a non-linear load which causes a total harmonic distortion of greater than 80% in the signal present at the outputs of the transformer.
Figure 9B:
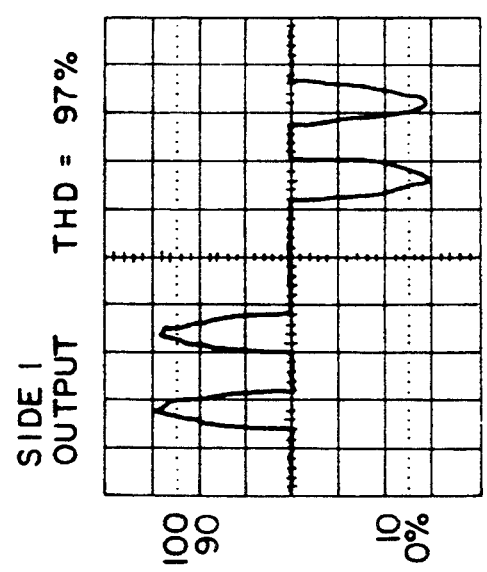
Figure 9C:
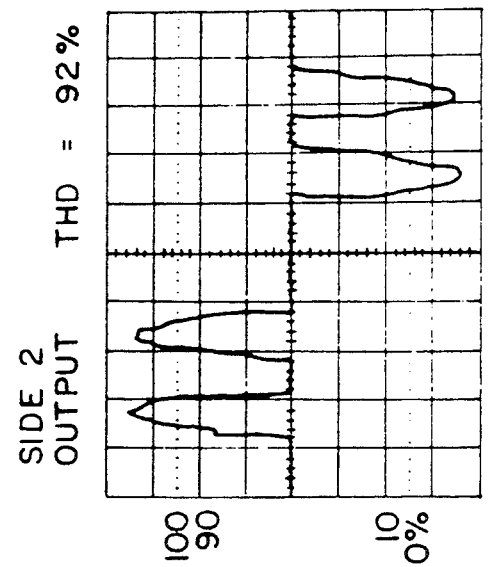
Figure 17:
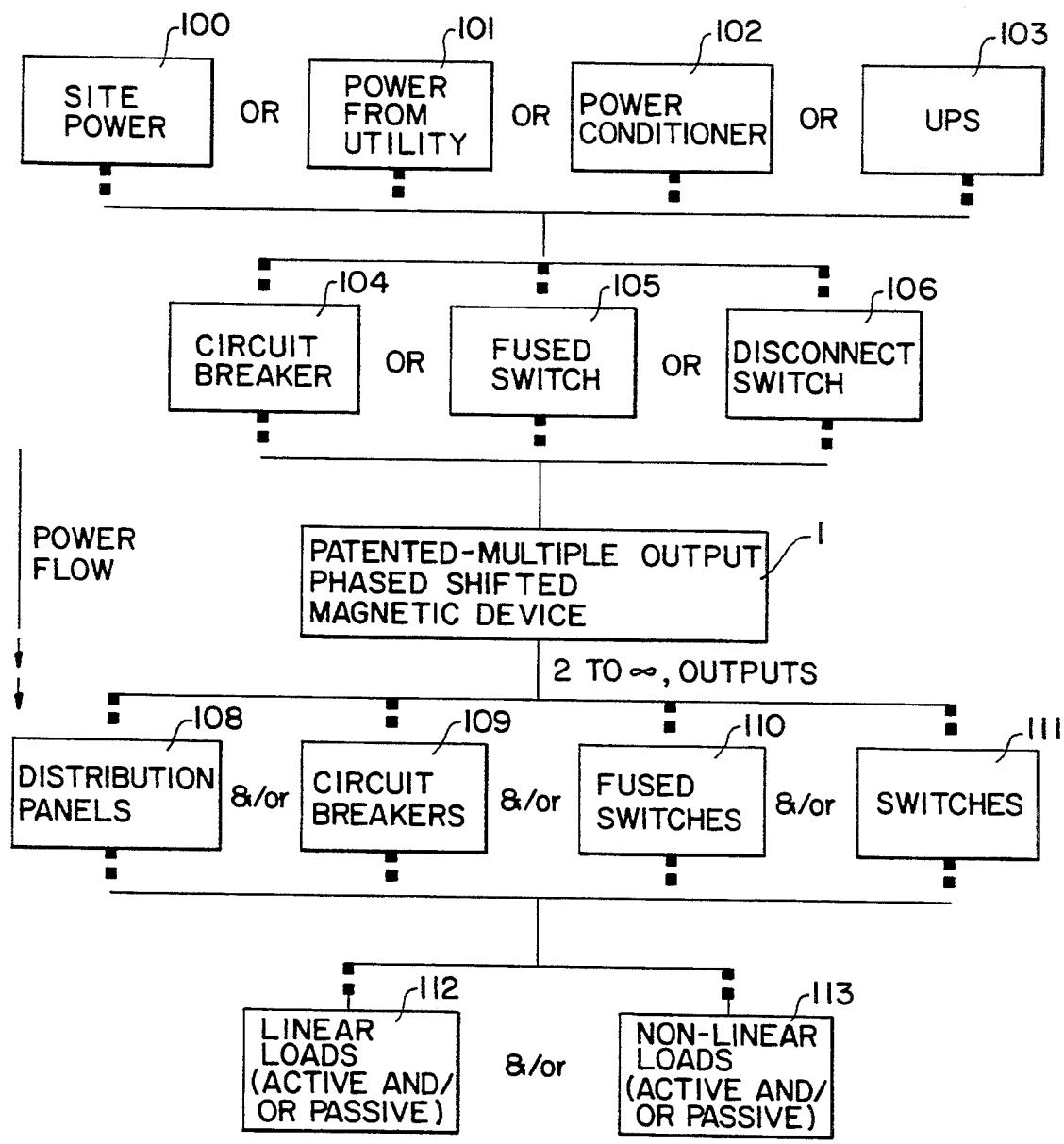
FIG. 17 is a block diagram of the manner in which the preferred magnetic cancellation device or transformer may be connected to a power source and a variety of loads.

An oscilloscope plot of the arrangement of FIG. 3 is shown in FIGS. 9(a)–9(c). FIG. 9(a) is a plot of the input side current, while FIGS. 9(b) and 9(c) are plots of the two output side currents connected to loads causing total harmonic distortions (THD) of 97% and 92% respectively. The input side THD is reduced to 25%, a dramatic improvement.

Under certain circumstances, it may also be advantageous to vary the relative phase shifts by amounts other than those described above, i.e., by amounts other than 60° divided by the number of outputs. The result is partial cancellation of selected orders. For example, partial cancellation of the 5th, 7th, 11th, 13th, 15th, and 17th harmonics can be achieved in a two output transformer with a differential secondary phase shift of 18°, as shown in FIG. 12, while different magnitudes of partial cancellation can be achieved by a transformer having two wye connected secondary outputs relatively phase shifted by 7.5°, as shown in FIG. 13.

As is apparent from FIG. 12, by setting for a 50% reduction in the 5th and 7th harmonics, one obtains a 70% reduction in the 11th and 13th harmonics. The fifth and seventh harmonics are not reduced at all in the two output, 30° embodiment of FIG. 8(a). Because the magnitudes of the various harmonic orders may vary with different loads, it is possible that under certain circumstances, the embodiments of FIGS. 12 and 13 may actually be preferable to that of FIGS. 8(a) or 8(b).

The normalized outputs for the embodiments of FIGS. 8(a), 10, 11(a), 14a and 14b and 15a and 15b, as well as that of FIG. 12, are summarized in the table of FIGS. 14a and 14b. It is apparent from FIGS. 14a and 14b that, by simply increasing the number of outputs, and relatively phase shifting them by 60° divided by the number of outputs, any number of selected harmonics can be caused to completely cancel. Furthermore, FIGS. 14a and 14b shows the advantages of incomplete cancellation, in the case of the two wye, 18° embodiment, which at least partially cancels a greater number of harmonics than does the two wye 30° embodiment.

Having thus described several specifically preferred embodiments of the invention, it will nevertheless be appreciated that numerous other variations are possible. For example, those skilled in the art will appreciate that the invention may easily be adapted to encompass multiple output transformers having more than six or eight three phase wye connected secondary outputs, so long as the outputs are phase shifted to prevent harmonic currents from appearing at the primary winding inputs. This concept may further be adapted to multiple phase transformers other than three-phase transformers. The higher the number of secondaries, the higher the number of harmonic orders that can be cancelled.

A few of the alternative configurations which are intended to be included within the scope of the invention are:

1. Two or more separate transformers provided with single or multiple phase shifted secondaries, harmonic cancellation occurring at the point where the primary feeders are paralleled, and which can also be connected in series to cancel harmonics.

2. Two or more transformers having only the main secondary winding, the vector windings being contained in separate auto or isolation transformers.

3. An autotransformer with main and vector coils, in a delta or wye configuration which does not cancel triplen harmonics.

Thus, it will be appreciated that the phase shifts and number of secondary windings can be varied as desired depending on the number of harmonic pairs and the degree of attenuation required for the harmonic pairs as noted above.

Each of the preferred transformer or magnetic cancellation device embodiments described above has in common the ability to be used in a wide variety of applications. A number of these applications are indicated in FIGS. 17–20, although it will be appreciated by those skilled in the art that FIGS. 17–20 are, like FIGS. 1–16, not exclusive, and that other applications may occur to those skilled in the art.

As shown in any of FIGS. 17–20, the input power to the preferred magnetic cancellation device or transformer can be supplied from a local power source 100, the utility power grid 101, a power conditioner 102 such as a line regulator or motor/alternator, or an uninterruptable power source 103. Before being routed to the magnetic cancellation device, the power may be routed through any or all of the following devices, which are preferably packaged with the magnetic cancellation device in a single unit: protective devices such as a circuit breaker 104, a fused switch 105, or a disconnect switch 106. Each of the outputs of the magnetic cancellation device or transformer 1 can be connected via distribution panels 108, circuit breakers 109, fuse switches 110, or disconnect switches 111 to either a linear load 112, which may be either active and/or passive, or a non-linear load 113, which also may be active and/or passive.

Figure 18:
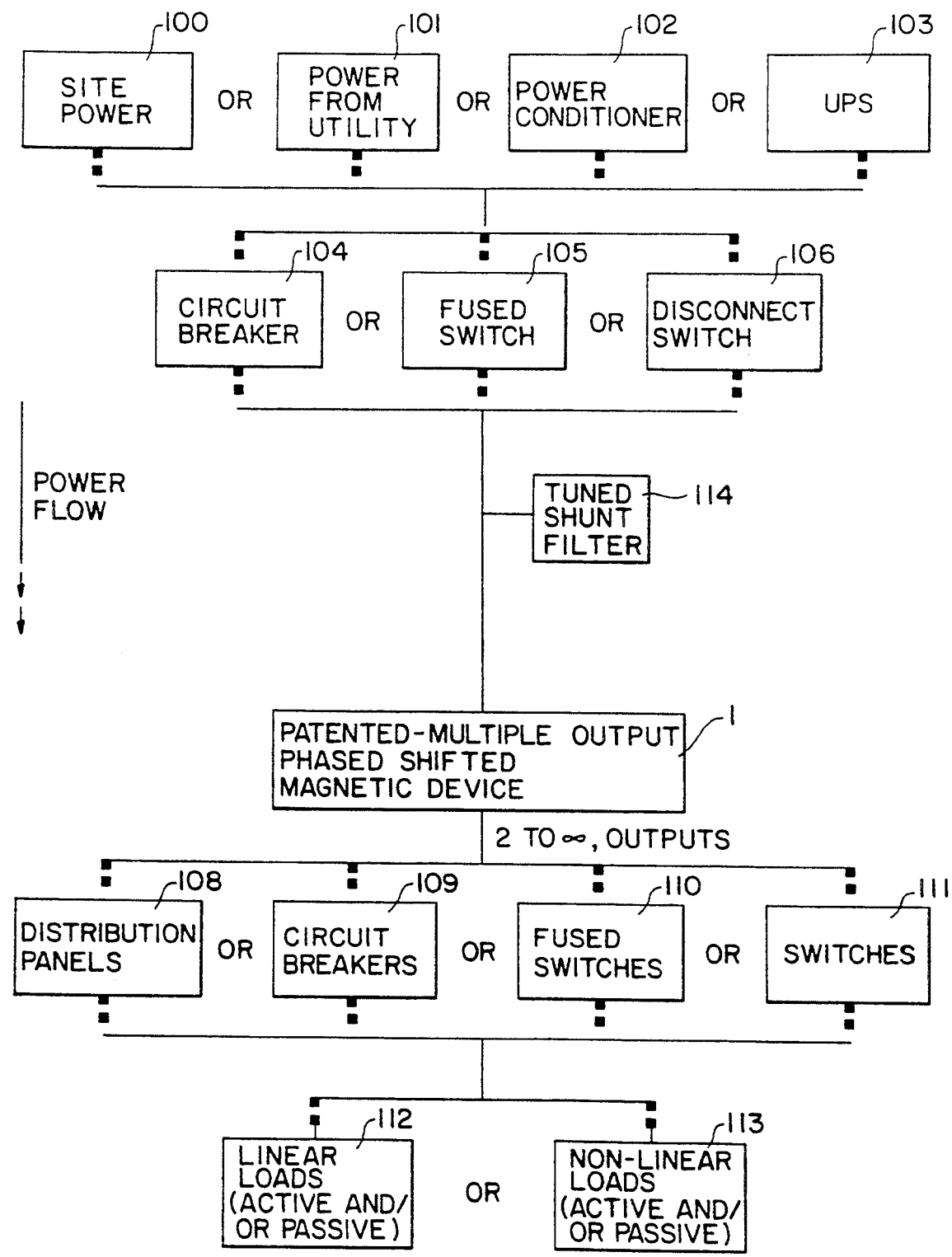
FIG. 18 is a block diagram of a variation of the system of FIG. 17 which includes a tuned shunt filter connected upstream of the magnetic cancellation device.
Figure 19:
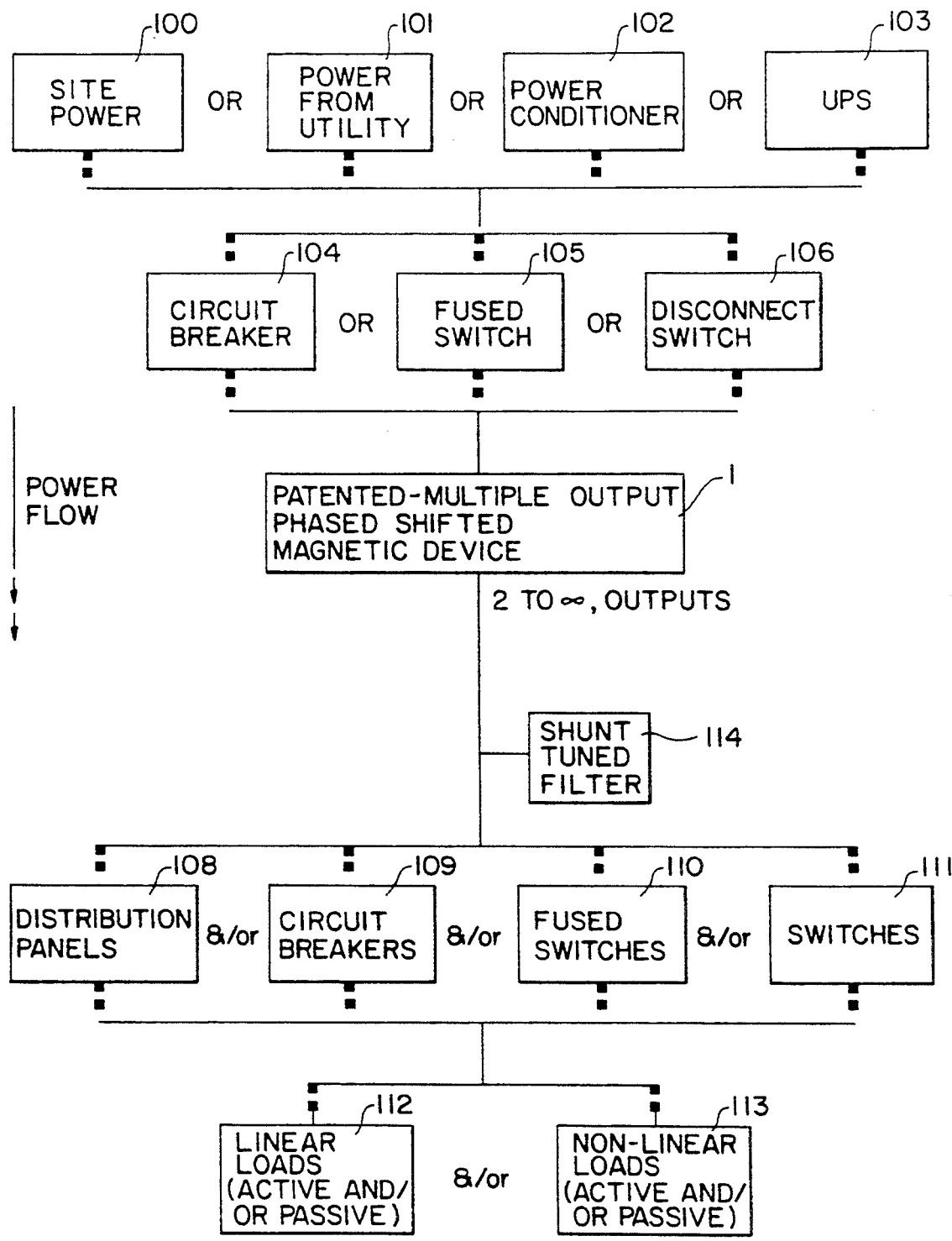
FIG. 19 is a block diagram of a variation of the system of FIG. 17 which includes a shunt tuned filter connected downstream of the magnetic cancellation device.
Figure 20:
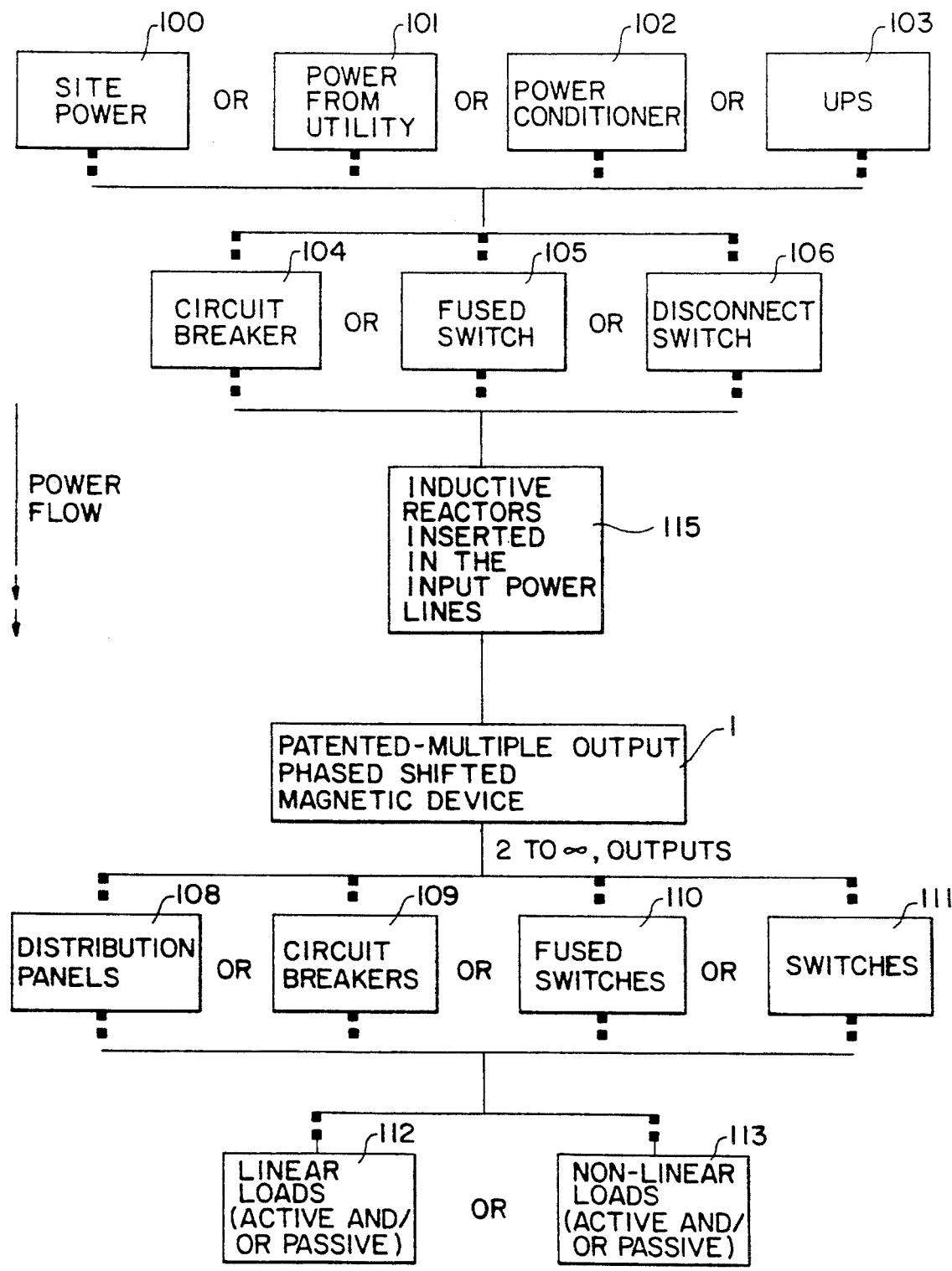
FIG. 20 is a block diagram of a variation of the system of FIG. 17 including inductive reactors inserted in the input power lines.

In addition to the above elements, common to FIGS. 17–20, the system may include, as shown in FIGS. 18 and 19, a tuned shunt filter 114 at either the input or output of the magnetic cancellation device to reduce total harmonic distortion caused by external sources. Numerous suitable shunt filters are known, including diode, varistor, and capacitor based circuits, depending on the frequencies, currents, and/or voltages of the signals or transients to be filtered. As shown in FIG. 20, the system may also include inductive reactors 115 inserted in the input power line for reducing the input current total harmonic distortion (THD). For example, reactor devices are known which are capable of reducing THD by a factor of up to two for high harmonic loads.

Finally, in view of the numerous variations of the invention which are likely to occur to those skilled in the art, it is again noted, and those skilled in the art will understand, that the above description is not to be construed as limiting, but rather than the invention be defined solely by the appended claims.

I claim:

1. A harmonic cancellation system, comprising:
    an input power source;
    at least one transformer core;
    a three-phase primary winding inductively coupled with said core and connected to said power source;
    at least two three-phase wye-connected output windings inductively coupled with said core, wherein said output windings are phase-shifted relative to each other to cause magnetic flux vectors generated in said core by harmonic currents present in the output windings to add to zero for respective orders of selected harmonic currents and thereby prevent the selected harmonic currents present in the output windings from being induced in said input windings; and
    a load connected to said output windings.

2. A harmonic cancellation system as claimed in claim 1, wherein said input power source is a power distribution network.

3. A system as claimed in claim 1, wherein said load is an electronic circuit which presents a non-linear load to the power source.

4. A system as claimed in claim 3, wherein said load is a data processing device.

5. A system as claimed in claim 3, wherein said load is a telecommunication device.

6. A system as claimed in claim 1, wherein said harmonic currents for which said magnetic flux vectors add to zero include at least harmonic currents of the first, fifth and seventh orders.

7. A system as claimed in claim 6, wherein said harmonic currents for which said magnetic flux vectors add to zero further include harmonic currents of the 11th and 13th orders.

8. A system as claimed in claim 6, wherein said input winding is a three-phase delta-connected input winding and all triplens are thereby cancelled due to the delta connection.

9. A system as claimed in claim 1, wherein said output windings comprise two three-phase wye-connected output windings, said two output windings having a relative phase shift of 30°.

10. A system as claimed in claim 1, wherein said output windings comprise four three-phase output windings, said four output windings having a relative phase shift of 15°.

11. A system as claimed in claim 1, wherein each of said output windings is a wye-connected output winding connected to a full or double current neutral.

12. A system as claimed in claim 11, wherein said output windings are connected to three output terminals for each of said output windings, a first end of an in-phase main secondary coil being directly connected to the neutral bus, a second end of said main secondary coil being connected to a first end of each of at least two output coils, and a second end of each of said at least two output coils being connected to one of said terminals.

13. A system as claimed in claim 12, comprising 12 of said output terminals and four of said three-phase output windings.

14. A system as claimed in claim 1, wherein the relative phase shift between said output windings is equal to 60° divided by the number of said output windings.

15. A system as claimed in claim 1, wherein said output windings comprise three three-phase output windings, said three output windings having a relative phase shift of 20°.

16. A system as claimed in claim 1, wherein said output windings comprise five three-phase output windings, said five output windings having a relative phase shift of 12°.

17. A system as claimed in claim 1, wherein said output windings comprise six three-phase output windings, said six output windings having a relative phase shift of 10°.

18. A harmonic cancellation system, comprising:
    an input power source;
    at least one transformer core;
    a three-phase primary winding inductively coupled with said core and connected to said power source;
    at least two three-phase wye-connected output windings inductively coupled with said core, wherein said output windings are phase-shifted relative to each other to cause magnetic flux vectors generated in said core by harmonic currents present in the output windings to partially cancel for respective orders of the selected harmonic currents to thereby prevent the selected harmonic currents present in the output windings from being induced in said input windings; and
    a load connected to said output windings.

19. A harmonic cancellation system as claimed in claim 18, wherein said input power source is a power distribution network.

20. A system as claimed in claim 18, wherein said load is an electronic circuit which presents a non-linear load to the power source.

21. A system as claimed in claim 20, wherein said load is a data processing device.

22. A system as claimed in claim 20, wherein said load is a telecommunication device.

23. A system as claimed in claim 18, wherein said input winding is a three-phase delta-connected input winding and all triplens are thereby cancelled due to the delta connection.

24. A system as claimed in claim 18, wherein said output windings comprise two three-phase wye-connected output windings, said two output windings having a relative phase shift of 18°.

25. A system as claimed in claim 18, wherein said output windings comprise two three-phase wye-connected output windings, said two output windings having a relative phase shift of 7.5°.

26. A system as claimed in claim 18, wherein each of said output windings is a wye-connected output winding connected to a full or double current neutral.

27. A system as claimed in claim 26, wherein said output windings are connected to three output terminals for each of said output windings, a first end of an in-phase main secondary coil being directly connected to the neutral bus, a second end of said main secondary coil being connected to a first end of each of at least two output coils, and a second end of each of said at least two output coils being connected to one of said terminals.

* * * * *